United States Patent
Riehle et al.

(10) Patent No.: US 7,932,349 B2
(45) Date of Patent: Apr. 26, 2011

(54) MEMBRANE SEPARATION PROCESS FOR REMOVING RESIDUALS POLYAMINE-EPIHALOHYDRIN RESINS

(75) Inventors: Richard J. Riehle, Wilmington, DE (US); Steven Vinciguerra, West Grove, PA (US)

(73) Assignee: Hercules Incorporated, Wilmington, DE (US)

( * ) Notice: Subject to any disclaimer, the term of this patent is extended or adjusted under 35 U.S.C. 154(b) by 844 days.

(21) Appl. No.: 11/856,224

(22) Filed: Sep. 17, 2007

(65) Prior Publication Data

US 2008/0066881 A1    Mar. 20, 2008

Related U.S. Application Data

(60) Provisional application No. 60/826,009, filed on Sep. 18, 2006.

(51) Int. Cl.
*C08G 64/00*    (2006.01)
*C08G 63/02*    (2006.01)

(52) U.S. Cl. .................. 528/480; 162/164.1; 162/164.3; 162/164.6; 435/262; 528/487; 528/502 R

(58) Field of Classification Search ............... 162/164.1, 162/164.3, 164.6; 435/262; 528/480, 487, 528/502 R
See application file for complete search history.

(56) References Cited

U.S. PATENT DOCUMENTS

| | | | |
|---|---|---|---|
| 4,659,475 A * | 4/1987 | Liao et al. ................. | 210/654 |
| 4,975,499 A | 12/1990 | Bachem et al. | |
| 5,009,789 A | 4/1991 | Helmer et al. | |
| 5,017,642 A | 5/1991 | Hasegawa et al. | |
| 5,019,606 A | 5/1991 | Marten et al. | |
| 5,171,795 A | 12/1992 | Miller et al. | |
| 5,189,142 A | 2/1993 | Devore et al. | |
| 5,239,047 A | 8/1993 | Devore et al. | |
| 5,256,727 A | 10/1993 | Dulany et al. | |
| 5,364,927 A | 11/1994 | Devore et al. | |
| 5,470,742 A | 11/1995 | Bull et al. | |
| 5,516,885 A | 5/1996 | Gorzynski et al. | |
| 5,614,597 A | 3/1997 | Bower | |
| 5,643,430 A * | 7/1997 | Gorzynski ................. | 204/523 |
| 5,714,552 A | 2/1998 | Bower | |
| 5,843,763 A | 12/1998 | Bull et al. | |
| 5,871,616 A | 2/1999 | Bull et al. | |
| 5,972,691 A | 10/1999 | Bates et al. | |
| 6,056,855 A | 5/2000 | Amey | |
| 6,056,967 A | 5/2000 | Steuerle et al. | |
| 6,057,420 A | 5/2000 | Amey | |
| 6,342,580 B1 | 1/2002 | Laurent et al. | |
| 6,376,578 B1 | 4/2002 | Gorzynski et al. | |
| 6,554,961 B1 * | 4/2003 | Riehle et al. ............... | 162/164.3 |
| 7,081,512 B2 * | 7/2006 | Riehle ....................... | 528/480 |
| 7,303,652 B2 | 12/2007 | Riehle et al. .............. | 162/164.3 |
| 2001/0034406 A1 | 10/2001 | Yamamoto et al. | |

FOREIGN PATENT DOCUMENTS

| | | |
|---|---|---|
| DE | 41 14 657 | 11/1992 |
| EP | 0 512 423 | 11/1992 |
| JP | 2002-201267 | 7/2002 |
| JP | 2003003395 | * 1/2003 |
| WO | WO-92/22601 | 12/1992 |
| WO | WO-96/40967 | 12/1996 |
| WO | WO-00/34358 | 6/2000 |
| WO | WO-00/67884 | 11/2000 |
| WO | WO-01/18093 | 3/2001 |

OTHER PUBLICATIONS

Guise et al., "The Chemistry of a Polyamide-Epichlorohydrin Resin (Hercosett 125) Used to Shrink-resist Wool", *The Journal of Applied Polymer Science*, vol. 30, pp. 4099-4111 (1985).

* cited by examiner

*Primary Examiner* — Terressa M Boykin
(74) *Attorney, Agent, or Firm* — Eamonn P. Morrison; Joanne Mary Fobare Rossi

(57) ABSTRACT

This invention relates to a process for preparing polyamine-epihalohydrin resins having reduced levels of residuals. The process comprises (a) charging a membrane separation apparatus with an aqueous composition comprising at least one polyamine-epihalohydrin resin, and (b) separating the aqueous composition into a permeate and a retentate by passing the aqueous composition through the membrane of the membrane separation apparatus. The retentate comprises at least one polyamine-epihalohydrin resin having lower levels of residuals on an equal active component basis than the aqueous composition of (a). The permeate comprises residuals removed from the aqueous composition of (a) and less than 5% by weight of the active component of said at least one polyamine-epihalohydrin resin. The polyamine-epihalohydrin resins having reduced levels of residuals can be used to make wet strength agents, dry strength agents, creping adhesives for paper products, curing agents for wood product adhesives, and other products.

16 Claims, No Drawings

MEMBRANE SEPARATION PROCESS FOR REMOVING RESIDUALS POLYAMINE-EPIHALOHYDRIN RESINS

This application claims benefit of U.S. Provisional Application Ser. No. 60/826,009, filed Sep. 18, 2006.

This invention is directed to processes for removing residuals, such as AOX species, salts, and other low molecular weight species, from polyamine-epihalohydrin resins and compositions comprising such resins. Loss of resin during these processes is limited to less than about 5% by weight. This invention is also directed to polyamine-epihalohydrin resins having low residuals content that are prepared according to the processes of the present invention, as well as compositions and products thereof, including wet strength agents, dry strength agents, creping adhesives for paper products, and curing agents for wood product adhesives. In certain embodiments polyamine-epihalohydrin resins prepared according to the processes of the present invention, and compositions and products thereof, maintain low levels of residuals during storage and possess reduced levels of AOX species and of inorganic chloride.

BACKGROUND

Wet strength resins are often added to paper and paperboard at the time of manufacture to enhance the strength of these products when wet. Paper manufactured with wet strength resins generally retains at least 10 to 50 percent of its strength when wet. In contrast, paper manufactured without such resins normally retains only 3 to 5 percent of its strength after wetting. Paper having enhanced wet strength is useful in a wide variety of applications, such as toweling, milk and juice cartons, paper bags, and liner board for corrugated containers.

Wet strength resins also enhance dry strength in paper. Dry strength is a critical paper property, particularly in light of the recent trend for paper manufacturers to use high yield wood pulps in paper in order to achieve lower costs. These high yield wood pulps generally yield paper with significantly reduced dry strength when compared to paper made from highly refined pulps.

Resins similar to those used for enhancing strength in paper are also often used as creping adhesives. In the manufacture of paper products such as facial tissue, bathroom tissue, or paper towels, the paper web is conventionally subjected to a creping process in order to give it desirable textural characteristics, such as softness and bulk. The creping process typically involves adhering a web (a cellulose web in the case of paper) to a rotating creping cylinder, such as a Yankee dryer, and then dislodging the adhered web with a doctor blade. The impact of the web against the doctor blade ruptures some of the fiber-to-fiber bonds within the web and causes the web to wrinkle or pucker.

The severity of this rupture is dependent upon a number of factors, including the degree of adhesion between the web and the surface of the creping cylinder. Greater adhesion results in increased softness, although generally with some loss of strength. In order to increase adhesion, a creping adhesive may be used to enhance any naturally occurring adhesion that the web may have due to its water content, which will vary widely depending on the extent to which the web has been previously dried.

A desirable creping adhesive is one that adheres the sheet just tightly enough to the drum to give a good crepe, while imparting absorbance and softness with the least possible loss of paper strength. If adhesion to the dryer drum is too strong, the sheet may pick or even "plug" (i.e., underride) the doctor blade, and wrap around the dryer drum. If there is insufficient adhesion, the sheet will lift off too easily and undergo too little creping. In addition to controlling the extent of creping, creping adhesives should also prevent wear of the dryer surface, provide lubrication between the doctor blade and the dryer surface, and reduce chemical corrosion.

The resins can also be used as adhesives or curing agents for adhesive formulations used in manufacturing engineered wood products, such as particleboard, oriented strand board (OSB), waferboard, fiberboard (including medium-density and high-density fiberboard), parallel strand lumber (PSL), laminated strand lumber (LSL), and similar products. Such adhesive compositions may be also be used to produce plywood or laminated veneer lumber (LVL). The engineered wood products can also be described as lignocellulosic-based composites, which are based on smaller wood particles bound together by an adhesive. Application of these adhesives when making engineered wood products and other types of useful materials can be achieved by roller coating, knife coating, extrusion, curtain coating, foam coaters, and spray coaters, for example, a spinning disk resin applicator. Resins are combined with a protein source, such as soy flour or soy protein isolates to form an adhesive. Functionalized polyamine-epichlorohydrin resins typically contain both azetidinium and aminochlorohydrin functionalities and these functional groups react with available amines, alcohols, and carboxylic acids in the adhesive/lignocellulosic system when heated.

Polyamine-epihalohydrin resins, such as polyaminopolyamide-epihalohydrin (PAE) resins, are commonly employed in the paper manufacturing industry as wet-strength resins, dry strength resins, and creping adhesives. Such resins often contain large quantities of epihalohydrin hydrolysis products and inorganic chloride, which is undesirable for workplace safety and environmental reasons. For example, commercial polyaminopolyamide-epichlorohydrin resins typically contain 0.5 to 10 percent by weight (dry basis) of the epichlorohydrin by-products 1,3-dichloropropanol (1,3-DCP), 2,3-dichloropropanol (2,3-DCP), and 3-chloropropanediol (CPD). Production of such resins with reduced levels of epichlorohydrin by-products has been the subject of much investigation. Workplace safety and environmental pressures have been increasing to produce resins with lower levels of epichlorohydrin by-products and other adsorbable organic halogen (AOX) species. AOX is the adsorbable organic halogen content of the resin, which can be determined by means of adsorption onto carbon. AOX species include epichlorohydrin and its by-products 1,3-DCP, 2,3-DCP, and CPD, as well as organic halogen bound to the resin polymer backbone. Removal of inorganic chloride (e.g., chloride salts) reduces the corrosivity of polyamine-epihalohydrin resins and minimizes loss of desired reactive functionality (i.e., the azetidinium moieties on the resin polymer backbone).

Several methods have been devised for reducing the quantities of AOX species in polyamine-epihalohydrin resins in the course of their manufacture. One method is reducing the quantity of epihalohydrin used in synthesizing the resin, as taught in U.S. Pat. Nos. 5,171,795 and 5,714,552. Another is maintaining control over the resin manufacturing process, as taught in U.S. Pat. No. 5,017,642. Yet another is treatment of the resin with nonpolymeric amine during its manufacturing process, as taught in U.S. Pat. No. 5,614,597. Chlorohydrin residues can also be removed by adding both inorganic bases and amines after viscosity increase has taken place, as taught in U.S. Pat. No. 5,019,606; German Pat. Pub. DE 41 14 657; and European Pat. EP 0 512 423. In addition, U.S. Pat. Nos.

5,189,142, 5,239,047, and 5,364,927 teach reduced levels of organically bound chlorine in polyamine-epihalohydrin resins.

Post-synthesis treatments to reduce the quantities of AOX species in polyamine-epihalohydrin resins are also known. For example, 1,3-dichloro-2-propanol, 3-chloro-1,2-propanediol, and epichlorohydrin can all be treated with alkali to produce glycerol. Epihalohydrin and epihalohydrin hydrolyzates can be reacted with bases to form chloride ion and polyhydric alcohols, as taught in U.S. Pat. Nos. 4,975,499 and 5,019,606. U.S. Pat. No. 5,256,727 teaches reacting epihalohydrin and its hydrolysis products with dibasic phosphate salts or alkanolamines in equimolar proportions to convert the chlorinated organic compounds into non-chlorinated species, U.S. Pat. Nos. 5,470,742; 5,843,763; and 5,871,616 teach the use of microorganisms or enzymes derived from microorganisms to remove epihalohydrin and epihalohydrin hydrolysis products from wet strength compositions without reduction in wet strength effectiveness. U.S. Pat. No. 5,972,691 and WO 96/40967 teach post-synthesis treatment of wet strength compositions with an inorganic base to reduce organohalogen content after the resin has been stabilized at low pH, followed by treatment with microorganisms or enzymes. U.S. Pat. Nos. 6,056,855; 6,057,420; 6,342,580 B1, and WO 01/18093 A1 teach treatments of resins with carbon adsorbents. U.S. Pat. Nos. 5,516,885 and 6,376,578 B1, and WO 92/22601 teach removal of halogenated by-products from resins using ion exchange resins.

EP 1 13 5 427 B1 describes a process for producing epichlorohydrin-crosslinked polyamidoamines with reduced AOX content via ultrafiltration of aqueous solutions of the resin. EP 1 135 427 B1 does not disclose removal of salts or the selective removal of chloride. U.S. Pat. No. 5,009,789 teaches a method for the separation and reuse of synthetic water-soluble resins, such as urea-formaldehyde resins, melamine-formaldehyde resins, and polyamidoamine-epichlorohydrin resins, of different molecular weight produced in a polymerization zone. U.S. Pat. No. 5,009,789 teaches that the separation is carried out so that at least 5 percent by weight of the original dry resin content is separated off in the permeate. U.S. Pat. No. 6,056,967 and WO 00/67884 disclose processes for subjecting an aqueous solution of a mixture of water-soluble, amino-containing condensates or adducts having an initial molecular weight distribution to ultrafiltration through membranes, wherein the condensates or adducts are selected from a variety of resins. The Journal of Applied Polymer Science, vol. 30, pp. 4099-4111, (1985) discloses that polyamidoamine-epichlorohydrin resins can be separated into a plurality of fractions by ultrafiltration. U.S. App. Pub. No. 2001/0034406 limits its ultrafiltration process to lower molecular weights fractions of 10,000 Daltons or less and JP 2002-201267 limits its ultrafiltration process to a molecular weight range of 3,000 to 30,000 Daltons. U.S. Pat. No. 5,643,430 discloses a process for reducing the content of organic and inorganic halogen in an aqueous solution of a nitrogen-containing epihalohydrin-based resin, characterized in that the aqueous solution is subjected to an electrodialysis treatment.

Even in view of the foregoing approaches, there continues to be a need for further improvement in preparing polyamine-epihalohydrin resins, specifically a need for further improvement in processes to remove residuals such as AOX species, chloride salts and other low molecular weight species from such resins. In particular, there remains a need for a more efficient and cost effective method of removing residuals from polyamine-epihalohydrin resin-based compositions, such as wet strength agents, dry strength agents, creping adhesives, and wood product adhesives. There also remains a need for polyamine-epihalohydrin resins and polyamine-epihalohydrin resin compositions having low AOX and inorganic chloride content, as well as paper products and wood product comprising such resins.

Unless otherwise stated, all patents, patent applications, articles, textbooks and any other publications cited herein are hereby incorporated by reference in their entireties to the extent they are not inconsistent with the present disclosure. The present disclosure supersedes these incorporated patents, patent applications, articles, textbooks, and any other publications to the extent they are inconsistent with the present disclosure.

EMBODIMENTS OF THE INVENTION

In one embodiment, the present invention relates to a process for preparing polyamine-epihalohydrin resins having reduced levels of residuals comprising (a) charging a membrane separation apparatus with an aqueous composition comprising at least one polyamine-epihalohydrin resin and (b) separating said aqueous composition into a permeate and a retentate by passing said aqueous composition through the membrane of said membrane separation apparatus, wherein said retentate comprises an aqueous composition comprising at least one polyamine-epihalohydrin resin having lower levels of residuals on an equal active component basis than the aqueous composition of (a), and wherein said permeate comprises residuals removed from the aqueous composition of (a) and less than 5% by weight of the active component of said at least one polyamine-epihalohydrin resin.

Another embodiment is the process of the present invention, wherein said residuals are selected from the group consisting of epichlorohydrin, DCP, CPD, salts, low molecular weight species, and combinations thereof.

Another embodiment is the process of the present invention, wherein said salts comprise chloride ions.

Another embodiment is the process of the present invention, wherein said polyamine-epihalohydrin resin comprises polyaminopolyamide-epichlorohydrin resin.

Another embodiment is the process of the present invention, wherein the CPD content of the polyamine-epihalohydrin resins having reduced levels of residuals is less than about 50 ppm at 12.5% active component of said at least one polyamine-epihalohydrin resin.

Another embodiment is the process of the present invention, wherein the DCP content of the polyamine-epihalohydrin resins having reduced levels of residuals is less than about 100 ppm at 12.5% active component of said at least one polyamine-epihalohydrin resin.

Yet another embodiment is a paper product or an adhesive composition for use in manufacturing wood products comprising the resin prepared according to the process of the present invention.

In yet another embodiment, the present invention relates to a process for preparing polyamine-epihalohydrin resins having reduced levels of residuals, comprising (a) charging a membrane separation apparatus with an aqueous composition comprising at least one polyamine-epihalohydrin resin; (b) separating said aqueous composition into a permeate and a retentate by passing said aqueous composition through the membrane of said membrane separation apparatus, wherein said retentate comprises an aqueous composition comprising at least one polyamine-epihalohydrin resin having lower levels of residuals on an equal active component basis than the aqueous composition of (a), and wherein said permeate comprises residuals removed from the aqueous composition of (a); and (c) treating the retentate with at least one basic agent under conditions to reduce and/or remove CPD-forming species, wherein the base treated retentate produces less than about 250 ppm dry basis of CPD when stored at pH 1 for 24 hours at 50° C.

Another embodiment is the process of the present invention, wherein said permeate further comprises less than 5% by weight of the active component of said at least one polyamine-epihalohydrin resin.

Another embodiment is the process of the present invention, wherein the polyamine-epihalohydrin resin comprises polyaminopolyamide-epichlorohydrin resin.

Yet another embodiment is a paper product or an adhesive composition for use in manufacturing wood products comprising the resin prepared according to the process of the present invention.

Another embodiment is the process of the present invention, further comprising treating the retentate of (c) with at least one acidic agent under conditions sufficient to obtain a gelation storage stable composition.

Another embodiment is the process of the present invention, wherein the acidic agent of said additional step is a non-halogen containing acid.

Yet another embodiment is a paper product or an adhesive composition for use in manufacturing wood products comprising the resin prepared according to the process of the present invention.

In yet another embodiment, the present invention relates to a process for preparing polyamine-epihalohydrin resins having reduced levels of residuals, comprising (a) treating at least one polyamine-epihalohydrin resin with at least one basic agent under conditions to reduce and/or remove CPD-forming species; (b) charging a membrane separation apparatus with an aqueous composition comprising the base-treated at least one polyamine-epihalohydrin resin; and (c) separating said aqueous composition into a permeate and a retentate by passing it through the membrane of said membrane separation apparatus, wherein said retentate comprises an aqueous composition comprising at least one polyamine-epihalohydrin resin having lower levels of residuals on an equal active component basis than the aqueous composition of (a), wherein said permeate comprises residuals removed from the aqueous composition of (a), and wherein the retentate produces less than about 250 ppm dry basis of CPD when stored at pH 1 for 24 hours at 50° C.

Another embodiment is the process of the present invention, wherein said permeate further comprises less than 5% by weight of the active component of said at least one polyamine-epihalohydrin resin.

Another embodiment is the process of the present invention, wherein the polyamine-epihalohydrin resin comprises polyaminopolyamide-epichlorohydrin resin.

Yet another embodiment is a paper product or an adhesive composition for use in manufacturing wood products comprising the resin prepared according to the process of the present invention.

Another embodiment is the process of the present invention, further comprising treating the base treated composition of (a) prior to (b) with at least one acidic agent under conditions sufficient to obtain a gelation storage stable composition.

Another embodiment is the process of the present invention, wherein the acidic agent of said additional step is a non-halogen containing acid.

Yet another embodiment is a paper product or an adhesive composition for use in manufacturing wood products comprising the resin prepared according to the process of the present invention.

DESCRIPTION OF THE INVENTION

As used herein and unless otherwise stated: (1) all percentages, parts, ratios, etc., are by weight; (2) a reference to a compound or component may refer to the compound or component by itself or to the compound or component in combination with other compounds or components, such as mixtures of compounds, solutions, and compositions; (3) a list of upper preferable values and lower preferable values of an amount, concentration, or other value or parameter specifically discloses all ranges formed from any pair of an upper preferred value and a lower preferred value, regardless of whether additional ranges are separately disclosed; (4) the definition of the term "composition" includes solutions; (5) the term "total solids" is defined as the solids that remain after the volatiles (e.g., solvents) have been removed from at least one polyamine-epihalohydrin resin or composition thereof; (6) the term "active solids" is defined as the at least one polyamine-epihalohydrin resin portion of the total solids.

Unless otherwise stated herein: (1) the terms "creping aid," "creping resin," "creping agent," and "creping adhesive" are used interchangeably and all have the same meaning throughout the specification; (2) the terms "3-chloro-1,2-propanediol," "3-chloropropanediol," "3-monochloropropanediol," "monochloropropandiol," "chloropropandiol," "CPD," "3-CPD," "MCPD," and "3-MCPD" are used interchangeably and all have the same meaning throughout the specification; (3) the terms "polyaminopolyamide-epihalohydrin resins," "polyaminoamide-epihalohydrin resins," "polyamidepolyamine-epihalohydrin resins," "polyaminepolyamide-epihalohydrin resins," "aminopolyamide-epihalohydrin resins," and "polyamide-epihalohydrin resins," and "PAE" are used interchangeably and all have the same meaning throughout the specification; (4) the terms "active solids," "active component," "actives," and "active" are used interchangeably and all have the same meaning throughout the specification; (5) the terms "residuals" and "residual components" are used interchangeably and all have the same meaning throughout the specification.

The present invention relates to a process for removing residuals from polyamine-epihalohydrin resins, as well as compositions thereof, via membrane separation with minimal loss of the active component. This process results in polyamine-epihalohydrin resins and compositions thereof having higher effectiveness and lower levels of residuals, which improves performance stability and reduces the corrosivity of the resin or composition comprising such resin. Furthermore, this technology is also more cost-effective than other technologies used for removal of residuals, such as basic ion exchange, biodehalogenation, carbon absorption, and solvent extraction.

In general, polyamine-epihalohydrin resins, or compositions thereof, having reduced levels of residuals may be prepared according to the process of the present invention by charging a membrane separation apparatus with an initial aqueous composition comprising at least one polyamine-epihalohydrin resin, followed by separating this initial aqueous composition into a permeate and a retentate by passing it through the membrane of the membrane separation apparatus. The retentate is the portion of the initial composition that is not passed through the membrane. The permeate is the portion of the initial composition that collects after being passed through the membrane. The retentate comprises an aqueous composition which comprises at least one polyamine-epihalohydrin resin having lower levels of residuals on an equal active component basis than the initial aqueous composition. The permeate comprises residuals removed from the initial aqueous composition and less than about 5% by weight of the active component in the polyamine-epihalohydrin resin contained in the initial aqueous composition. Thus, the present invention relates to a process for preparing polyamine-epihalohydrin resins, or compositions thereof, having reduced levels of residuals, comprising (a) charging a membrane separation apparatus with an aqueous composition comprising at least one polyamine-epihalohydrin resin; and (b) separating said aqueous composition into a permeate and a retentate by passing said aqueous composition through the membrane of said membrane separation apparatus, wherein said retentate comprises an aqueous composition comprising at least one polyamine-epihalohydrin resin having lower levels of residuals on an equal active component basis than the aqueous composition of (a), and wherein said permeate comprises residuals removed from the aqueous composition of (a) and less than 5% by weight of the active component of said at least one polyamine-epihalohydrin resin.

The level of residuals in the retentate and permeate is membrane dependent. Membranes have different levels of "rejection." For example, a preferred membrane of the present invention will "reject" sulfate relative to chloride and therefore the retentate will have a lower level of chloride than the permeate. In another example of a preferred membrane, the retentate and the permeate will have the same level of DCP and CPD as the aqueous composition charged to the membrane separation apparatus. In another example of one preferred membrane, the retentate will have a low level of DCP and CPD and the permeate will have a high level of DCP and CPD relative to that of the aqueous composition charged to the membrane separation apparatus. In the present invention, the retentate has lower levels of residuals on an equal active component basis than the starting aqueous composition.

According to the process of the present invention, the permeate preferably comprises less than about 5% by weight of the active component of the at least one polyamine-epihalohydrin resin contained in the initial aqueous composition. In other words, removal of residuals from polyamine-epihalohydrin resins, or compositions thereof, by the process of the present invention can be achieved wherein loss of the polymeric and oligomeric fraction to the permeate is limited to less than about 5% by weight of the polymer and oligomer contained in the initial composition. The process of the present invention may also be employed to remove residuals from polyamine-epihalohydrin resins, or compositions thereof, while limiting the loss of the polymeric and oligomeric fraction to less than about 4% by weight, less than about 3% by weight, less than about 2% by weight, less than about 1% by weight, less than about 0.5% by weight, less than about 0.4% by weight, less than about 0.3% by weight, less than about 0.2% by weight, less than about 0.1% by weight, or less than about 0.05% by weight.

As already stated, the process of the present invention can be used to remove residuals from polyamine-epihalohydrin resins and compositions thereof. As used herein, residuals include AOX species, such as epihalohydrin and the epihalohydrin by-products 1,3-dichloropropanol (1,3-DCP), 2,3-dichloropropanol (2,3-DCP), and 3-chloropropanediol (CPD); organic and inorganic salts, such as chloride salts; and other low molecular weight species, such as monomeric compounds. As used herein, low molecular weight species are defined as molecules, ions, and radicals having a molecular weight of less than 1000 Daltons.

Inorganic salts, preferably chloride salts, can be removed from polyamine-epihalohydrin resins and compositions thereof by the process of the present invention with a minimal loss of the active component. Relative to the total solids of the composition, percent removal of inorganic salt content from polyamine-epihalohydrin resin composition can be greater than about 20% by weight, greater than about 40% by weight, greater than about 60% by weight, greater than about 80% by weight, greater than about 90% by weight, greater than about 95% by weight, greater than about 98% by weight, or greater than about 99% by weight can be achieved by the process of the present invention.

Removal of chloride salts is especially desirable to reduce corrosivity of the aqueous composition and to minmize loss of azetidinium functionality over time, particularly in polyamine-epihalohydrin resins and other epichlorohydrin-based resins. Thus, polyamine-epihalohydrin resins, and compositions thereof, prepared according to the process of the present invention undergo reduced loss of azetidinium during aging. According to the process of the present invention, chloride salts can also be removed from polyamine-epihalohydrin resins and compositions thereof with minimal loss of the active component. Relative to total solids of the at least one polyamine-epihalohydrin resin or composition thereof, percent removal of chloride salt content from polyamine-epihalohydrin resin of greater than about 20% by weight, greater than about 30% by weight, greater than about 40% by weight, greater than about 50% by weight, greater than about 60% by weight, greater than about 70% by weight, greater than about 80% by weight, greater than about 90% by weight, greater than about 95% by weight, greater than about 98% by weight, greater than about 99% by weight, or about 100% by weight can be achieved by the process of the present invention. Chloride salts are preferably selectively removed relative to other salts, for example sulfate salts. The weight ratio of selective removal of chloride salt content relative to total salts content from polyamine-epihalohydrin resins can be about 1.1:1.0, about 1.5:1.0, about 2.0:1.0, about 3.0:1.0, about 4.0:1.0, about 5.0:1.0, about 6.0:1.0, about 7.0:1.0, about 8.0:1,0, about 9.0:1.0, about 10:1.0, about 15:1.0, about 20:1.0, about 30:1.0, about 40:1.0, about 50:1.0, about 60:1.0, about 70:1.0, about 80:1.0, about 90:1.0, or about 100:1.

According to the process of the present invention, removal of residual components from polyamine-epihalohydrin resins and compositions thereof is achieved by membrane separation, e.g., nanofiltration and ultrafiltration, of solutions of such resins. Many different membrane separation processes and modes of operation can be used in the present invention. Preferred modes of operation include batch, modified batch, continuous stages in series, constant volume diafiltration, and discontinuous diafiltration. Important factors in selecting a membrane include the type of residuals to be removed, potential for membrane fouling, feed and product pH, yield loss, membrane efficiency, and permeate flux rates. Permeate flux rate is volumetric flux, i.e., the flow of solvent and solutes that pass through the membrane. Volumetric flux is typically expressed as volume/membrane area/time or lmh (liters/$m^2$/h) or GFD (gallons/$ft^2$/day). Volumetric flux is a function of hydrostatic pressure difference, osmotic pressure, permeability coefficient, temperature, and the membrane. In general, nanofiltration membranes have been found to exhibit all of the desired attributes for efficient removal of residuals from polyamine-epihalohydrin resins and compositions thereof; although ultrafiltration membranes can also be used. Nanofiltration falls between reverse osmosis and ultrafiltration with respect to the molecular size of components that can be removed. The nominal molecular weight cutoff for nanofiltration is 1000 Daltons or less. In addition, nanofilters typically operate at higher pressures than ultrafilters.

Nanofiltration membranes with nominal molecular weight cutoff from 150 Daltons to 1000 Daltons have been found to be effective in removing residuals from polyamine-epihalohydrin resins and compositions thereof with minimal product yield loss. For a particular type of membrane, product yield loss typically increases as the molecular weight cutoff increases. Ultrafiltration membranes are also capable of removing residuals from polyamine-epihalohydrin resins and compositions thereof at the expense of removing a greater quantity of the starting feed preparation, resulting in additional yield loss and additional organic loading in the permeate. Additional organic loading in the permeate is undesirable if the permeate is waste, especially if treated in a wastewater plant.

Operating pressure and temperature of the membrane separation process of the present invention are determined primarily by the limits of the membrane used. Nonetheless, operating pressures of the membrane separation process of the present invention can range from about 10 psig to about 2000 psig, from about 15 psig to about 1500 psig, from about 20 psig to about 1000 psig, from about 30 psig to about 800 psig, from about 40 psig to about 700 psig, from about 50 psig to about 500 psig, from about 100 psig to about 400 psig, from about 100 psig to about 500 psig, from about 100 psig to about 700 psig, from about 100 psig to about 800 psig, from about 100 psig to about 1000 psig, from about 100 psig to about 1 500 psig, from about 100 psig to about 2000 psig, from about 200 psig to about 400 psig, from about 200 psig to about 500 psig, from about 200 psig to about 700 psig, from about 200 psig to about 800 psig, from about 200 psig to about 1000 psig, from about 200 psig to about 1500 psig, or from about 200 psig to about 2000 psig. A particular membrane will have its own optimum operating pressure range. Higher flux rates are attainable at higher operating temperature. As the temperature of the membrane separation process increases, the permeate flux rate increases. The higher the permeate flux rate, the greater the efficiency of the process. It is preferred to operate at high temperature, but high temperature is detrimental to the polyamine-epihalohydrin resin, causing loss of azetidinium functionality and changing the molecular weight.

Operating temperatures of the membrane separation process of the present invention can be from about 0° C. to about 90° C., from about 5° C. to about 80° C., from about 10° C. to about 70° C., from about 15° C. to about 60° C., from about 20° C. to about 50° C., from about 15° C. to about 90° C., from about 15° C. to about 80° C., from about 15° C. to about 70° C., from about 60° C., from about 15° C. to about 50° C., from about 15° C. to about 40° C., from about 20° C. to about 40° C., from about 20° C. to about 60° C., from about 20° C. to about 70° C., from about 25° C. to about 40° C., from about 25° C. to about 60° C., or from about 25° C. to about 70° C.

Water and aqueous solvents and solutions are preferred solvents. For the purposes of the process of this invention and unless otherwise stated, in addition to water, aqueous solvents and aqueous solutions may further comprise dissolved solids and gases, as well as other solvents such as methanol, ethanol and ethyl acetate. Solvent to feed ratios can be varied to achieve desired levels of residuals. Solvent to feed ratios are dependent on both the starting concentration of residuals in feed and target residuals in the final product. Typical ratios range from about 0.1:1 to about 100:1, from about 0.2:1 to about 60:1, from about 0.5:1 to about 40:1, from about 1:1 to about 20:1, from about 2:1 to about 15:1, from about 3:1 to about 10:1, from about 0.5:1 to about 20:1, from about 0.5:1 to about 10:1, from about 0.5:1 to about 5:1, from about 1:1 to about 10:1, from about 1:1 to about 5:1. An equal volume of solvent to feed can be referred to as 1 wash or 1 volume. Typical volumes range from 0.2 to about 50, 0.5 to about 40, from about 1 to about 20, from about 2 to about 10, from about 3 to about 5, from about 0.2 to about 20, from about 0.2 to about 10, from about 0.2 to about 5, from about 0.5 to about 20, from about 0.5 to about 10, from about 0.5 to about 5, from about 1 to about 20, from about 1 to about 10, or from about 1 to about 5.

The membrane separation process of the present invention provides polyamine-epihalohydrin resins with reduced levels of residuals. The level of this residuals reduction is dependent on the amount of feed and the amount of solvent. Relative to the initial feed before diluting with solvent, the DCP and CPD levels of polyamine-epichlorohydrin resins prepared according to the process of the present invention can be decreased by about 99.99%, by about 99.9%, by about 99.5% by about 99%, by about 95%, by about 90%, by about 80%, by about 70%, by about 60%, by about 50%, by about 40%, by about 30%, by about 20% and by about 10%.

In the present invention, after the initially charged aqueous composition comprising at least one polyamine-epihalohydrin resin is separated into a retentate and a permeate, the retentate has a higher level of active component than the initially charged aqueous composition. The residual levels of the retentate can be higher or lower than the residuals level in the initially charged aqueous composition. However, if the active component is normalized to the same level, then the retentate has lower levels of residuals than the initially charged aqueous composition. For the present invention, equal active component basis is defined as normalization of the active component levels such that the level of active component is the same in the compositions that are being compared. For example, if 200 Kg of initially charged aqueous composition with 10% active component is separated into 100 Kg of retentate composition with 20% active component and 100 Kg of permeate, the initially charged aqueous composition and the retentate have an equal active component basis.

The DCP level of polyamine-epichlorohydrin resins prepared according to the process of the present invention can be less than about 5000 ppm at 12.5% active, less than about 2000 ppm at 12.5% active, less than about 1000 ppm at 12.5% active, less than about 800 ppm at 12.5% active, less than about 700 ppm at 12.5% active, less than about 600 ppm at 12.5% active, less than about 500 ppm at 12.5% active, less than about 400 ppm at 12.5% active, less than about 300 ppm at 12.5% active, less than about 200 ppm at 12.5% active, less than about 100 ppm at 12.5% active, less than about 50 ppm at 12.5% active, less than about 20 ppm at 12.5% active, less than about 10 ppm at 12.5% active, less than about 5 ppm at 12.5% active, less than about 1 ppm at 12.5% active, or less than about 0.5 ppm at 12.5% active component of at least one polyamine-epihalohydrin resin.

The CPD level of polyamine-epichlorohydrin resins prepared according to the process of the present invention can be less than about 1000 ppm at 12.5% active, less than about 800 ppm at 12.5% active, less than about 700 ppm at 12.5% active, less than about 600 ppm at 12.5% active, less than about 500 ppm at 12.5% active, less than about 400 ppm at 12.5% active, less than about 300 ppm at 12.5% active, less than about 200 ppm at 12.5% active, less than about 100 ppm at 12.5% active, less than about 50 ppm at 12.5% active, less than about 20 ppm at 12.5% active, less than about 10 ppm at 12.5% active, less than about 5 ppm at 12.5% active, less than about 1 ppm at 12.5% active, and less than about 0.5 ppm at 12.5% active component of at least one polyamine-epihalohydrin resin.

In one embodiment, an aqueous, non-chloride, salt solution, is a preferred solvent to enhance removal of chloride ions. Preferably, the non-chloride salt solution comprises sodium sulfate, sodium hydrogen sulfate, sodium nitrite, sodium dihydrogen phosphate, potassium sulfate, potassium hydrogen sulfate, potassium nitrite, and/or potassium dihydrogen phosphate. Preferably, the non-chloride salt solution comprises sodium sulfate and sodium hydrogen sulfate.

The membrane separation process of the present invention can be run in batch or continuous mode. Dilution water can be added all at once, in stepwise fashion, or as a fixed ratio with feed in a continuous process, with or without recycle. Spiral, tubular, or vibrating cross flow membranes are acceptable. Any equipment or apparatus that uses nanofiltration or ultrafiltration membranes is acceptable.

Membrane modes of operation include batch, modified batch, continuous stages in series, constant volume diafiltration, and discontinuous diafiltration. These are modes of operation familiar to one skilled in the art of membrane separation. Stages usually vary from 1 to 5 and can be increased if desired. Temperature can be varied from stage to stage. Modes of operation can be mixed. For example, diafiltration can be followed by a concentration step in either batch or continuous operation. The optimal choice of mode of operation depends on membrane flux rates as a function of concentration, temperature, pressure, and desired reduction of impurities.

Total solids and/or active solids concentration of the retentate composition can be lower, the same, or higher than the initial solids concentrations. Initial feed solids can be from about 0.5% to about 50%, from about 1% to about 30%, from about 2% to about 25%, from about 3% to about 20%, from about 4% to about 15%, from about 5% to about 10%, from about 3% to about 30%, from about 3% to about 25%, from about 3% to about 20%, from about 3% to about 15%, from about 3% to about 10%, from about 4% to about 20%, from about 4% to about 10% from about 5% to about 20%, from about 5% to about 15%, from about 1% to about 25% from about 1% to about 20%, from about 1% to about 15%, from about 1% to about 10%, from about 2% to about 25%, from about 2% to about 20%, from about 2% to about 15%, or from about 2% to about 10%. Final product solids can be from about 4% to about 50%, from about 5% to about 40%, from about 10% to about 30%, from about 1 0% to about 25%, from about 12.5% to about 25%, from about 12.5% to about 20%, or from about 15% to about 20%.

Membrane equipment is designed to minimize the effects of membrane fouling. Membrane fouling reduces permeate flux rate requiring more membrane area, at additional cost, to achieve the same level of productivity. In addition to optimizing equipment design, cleaning protocols to minimize the effects of membrane fouling are important to achieving an economically viable process. Typically, the membrane system will be cleaned every 8-24 hours with a cleaning composition. For the present invention, aqueous solutions of acids, preferably hydrochloric acid, phosphoric acid, nitric acid, sulfuric acid and/or citric acid are more effective at removing fouling (and thereby recovering permeate flux rate) than water. Typically, the cleaning composition improves in effectiveness as the pH is decreased and temperature is increased, but the membrane material of construction limits the minimum allowed pH and the maximum allowed temperature. Preferably, the cleaning composition is less than pH 4, preferably less than pH 3. Preferably, the cleaning composition is greater than about 30° C., preferably greater than about 40° C. and preferably greater than about 50° C. The cleaning composition can also contain surfactants. A caustic cleaning step, preferably at pH 10-12 and optionally containing surfactants, after an acid cleaning step is also a preferred cleaning process.

Polyamine-epihalohydrin resins, particularly those used for the purpose of imparting wet strength to paper, may be treated according to the membrane separation process of the present invention. The polyamine-epihalohydrin resins generally referred to herein include, but are not limited to, polyaminopolyamide-epihalohydrin resins, polyalkylene polyamine-epihalohydrin resins, polyaminourylene-epihalohydrin resins, copolyamide-polyurylene-epihalohydrin resins, polyamide-polyurylene-epihalohydrin resins, with the epihalohydrin preferably being epichlorohydrin in each instance. Nonetheless, the epihalohydrin may be epifluorohydrin, epichlorohydrin, epibromohydrin, epuiodohydrin, or mixtures thereof. Particularly preferred resins for the purposes of this invention include polyaminoamide-epichlorohydrin wet-strength resins as described in U.S. Pat. Nos. 2,926,154; 3,332,901; 3,891,589; 3,197,427; 4,240,935, 4,857,586; 6,554,961; 7,081,512; European Patent Publication 0 349 935; Great Britain Patent 865,727; and U.S. patent application Ser. Nos. 09/629,629; 09/592,681; 09/363,224; and 09/330,200. These resins include epichlorohydrin-based resins and nitrogen-containing cationic polymers, both of which are derived from epichlorohydrin reactants. Furthermore, the polyaminoamide-epichlorohydrin resin treated by the membrane separation process of the present invention may be a KymeneO brand polyaminoamide-epichlorohydrin resin, such as Kymene®557H, Kymene® 621, Kymene® 821, Kymene® 557LX, Kymene® SLX2, Kymene® 617, Kymene® 625, Kymene® 624, Kymene® 20 X-Cel, Kymene®217LX, Kymene® G3 X-Cel, Kymene® Plus, Kymene® 450, and Kymene® 736 wet strength resins, available from Hercules Incorporated, Wilmington, Del. Processes for making these known resins are also disclosed in the above-cited references.

The molecular weight of the polyamine-epihalohydrin resins prepared according to the process of the present invention is greater than about 2000 Daltons, preferably greater than about 5000 Daltons. Preferably, the molecular weight of the polyamine-epihalohydrin resins prepared according to the process of the present invention is from about 5000 Daltons to about 1,000,000 Daltons, more preferably from about 10,000 Daltons to about 500,000 Daltons. The molecular weight of the polamine-epihalohydrin resins prepared according to the process of the present invention can be from about 10,000 Daltons to about 2,000,000 Daltons, from about 20,000 Daltons to about 2,000,000 Daltons, from about 50,000 Daltons to about 2,000,000 Daltons, from about 100,000 Daltons to about 2,000,000 Daltons, from about 20,000 Daltons to about 1,000,000 Daltons, from about 50,000 Daltons to about 1,000,000 Daltons, from about 100,000 Daltons to about 1,000,000 Daltons, from about 20,000 Daltons to about 500,000 Daltons, from about 50,000 Daltons to about 500,000 Daltons, or from about 100,000 Daltons to about 500,000 Daltons.

Epichlorohydrin containing resins that can be treated according to the process of the present invention are characterized by the presence of N-chlorohydrin groups of the formula (I) and isomeric 3-hydroxyazetidinium chloride groups of the formula (II):

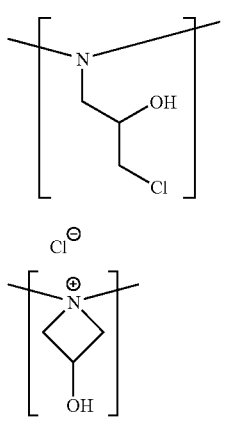

(I)

(II)

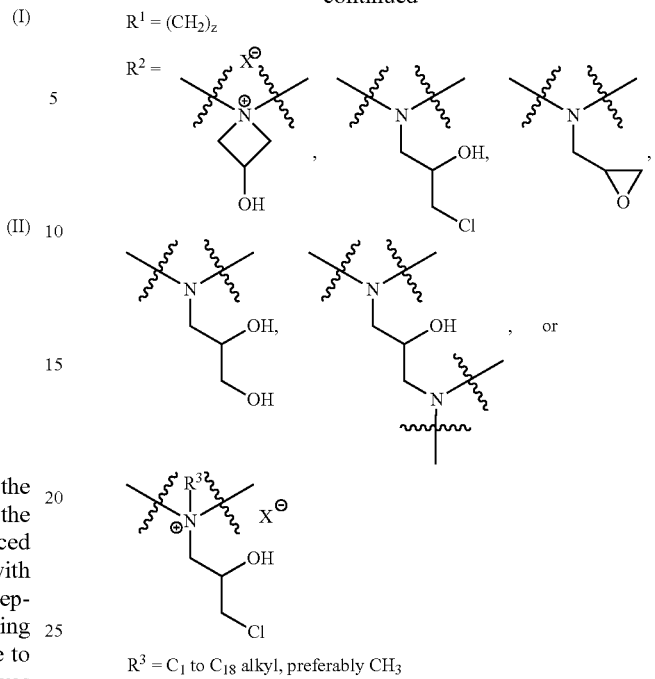

$R^1 = (CH_2)_z$ $R^3 = C_1$ to $C_{18}$ alkyl, preferably $CH_3$

Preferred polyamines that may be used in preparing the polyamine-epihalohydrin resins to be treated according to the membrane separation process of this invention are produced by reacting a dicarboxylic acid, or a derivative thereof, with methyl bis(3-aminopropyl) amine or with a polyalkylenepolyamine containing from two to four alkylene groups having two to four carbons, two primary amine groups, and one to three secondary amine groups. Dicarboxylic acid derivatives suitable for preparing the polyaminoamides include esters, anhydrides and acid halides. Procedures for preparing polyaminoamides from polyalkylenepolyamines are described in U.S. Pat. No. 2,926,154. Procedures utilizing methyl bis(3-aminopropyl) amine for preparation of polyaminoamides are described in U.S. Pat. Nos. 5,338,807 and 5,994,449.

Expanding upon the above, polyaminopolyamide-epichlorohydrin resins comprise the water-soluble polymeric reaction product of epichlorohydrin and polyamide derived from polyalkylene polyamine and saturated aliphatic dibasic carboxylic acid containing from about 2 to about 10 carbon atoms. Preferred polyaminoamides for this invention are produced by reacting a dicarboxylic acid, or a derivative thereof, with a polyalkylenepolyamine containing from two to four alkylene groups having two to four carbons, two primary amine groups, and one to three secondary amine groups. Dicarboxylic acid derivatives suitable for preparing the polyaminoamides include esters, anhydrides, and acid halides. It has been found that resins of this type impart wet-strength to paper whether made under acidic, alkaline or neutral conditions. Moreover, such resins are substantive to cellulosic fibers so that they may be economically applied thereto while the fibers are in dilute aqueous suspensions of the consistency used in paper mills.

In the preparation of the cationic resins contemplated for use herein, the dibasic carboxylic acid is first reacted with the polyalkylene polyamine, under conditions such as to produce a water-soluble polyamide, which is then reacted with an epihalohydrin to form a resin containing recurring units generally having the structure of formula (III):

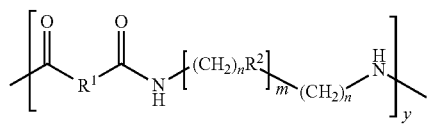

(III)

wherein z is an integer from 1 to 10, preferably 2 to 10, m is an integer from 1 to 4, n is an integer from 1 to 8, and y is an integer from about 2 to about 10000, preferably from about 5 to about 3000. The negative counterion $X^-$ represents a simple anion, which is not covalently bound to the polymer chain. Generally, $X^-$ is a chloride ion, which can be exchanged for other anions, e.g., hydrogen sulfate ion and sulfate ion.

A preferred resin of formula (III) that may be treated according to the process of present invention is a PAW resin having the structure of formula (IV):

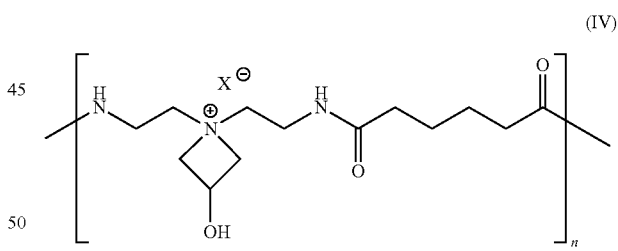

(IV)

wherein n is an integer of from about 2 to about 10000, preferably from about 5 to about 3000. The tetrasubstituted quaternary nitrogen atom is positively charged and hence cationic. The nitrogen atom is part of a 4-membered ring (i.e., a 3-hydroxyazetidinium group). Other uncharged polymer units also co-exist along polymer chains of this type of resin. Even though a few negatively charged (i.e., anionic) groups may also be present on the polymer, the net charge along the polymer chain is positive. The negative counterion $X^-$ represents a simple anion, which is not covalently bound to the polymer chain. Generally, $X^-$ is a chloride ion, which can be exchanged for other anions, e.g., hydrogen sulfate ion and sulfate ion.

The dicarboxylic acids that may be used in preparing the PAE resins to be treated according to the process of the present invention are the saturated aliphatic dibasic carboxylic acids containing from 2 to 10 carbon atoms such as oxalic acid, malonic acid, succinic acid, glutaric acid, adipic acid, azelaic acid, and the like. The saturated dibasic acids and their derivatives having from 3 to 8 carbon atoms in aliphatic chain connecting the two carboxylate moieties, such as adipic acid, dimethyl adipate, glutaric acid, and dimethyl glutarate are preferred. Blends of two or more of the saturated dibasic carboxylic acids may also be used. Derivatives of dibasic carboxylic acids, such as esters, half-esters, acid halides, and anhydrides can also be used in the present invention, such as dimethyl adipate, diethyl adipate, dimethyl glutarate, diethyl glutarate, dimethyl succinate, and diethyl succinate. Blends of two or more of derivatives of dibasic carboxylic acids may also be used, as well as blends of one or more derivatives of dibasic carboxylic acids with dibasic carboxylic acids.

The polyalkylene polyamines that may be used to prepare the PAE resins to be treated according to the process of the present invention include polyethylene polyamines, polypropylene polyamines, polybutylene polyamines, polypentylene polyamines, polyhexylene polyamines and so on and their mixtures may be employed. Polyethylene polyamines represent an economically preferred class. In addition to polyamines such as diethylenetriamine, triethylenetetramine, tetraethylenepentamine and dipropylenetriamine, which can be obtained in reasonably pure form, mixtures and various crude polyamine materials may be used to prepare the PAL resins to be treated according to the process of the present invention. For example, the mixture of polyethylene polyamines obtained by the reaction of ammonia and ethylene dichloride, refined only to the extent of removal of chlorides, water, excess ammonia, and ethylenediamine, is a satisfactory starting material. Thus, the term "polyalkylene polyamine" refers to and includes any of the polyalkylene polyamines referred to above or to a mixture of such polyalkylene polyamines and derivatives thereof. Additional polyamines suitable for preparing the PAL resins to be treated according to the process of the present invention include; bis-hexamethylenetriamine (BHMT), methylbisaminopropylamine (MBAPA), and other polyalkylene polyamines (e.g., spermine, spermidine). Preferably, the polyamines are diethylenetriamine, triethylenetetramine, tetraethylenepentamine and dipropylenetriamine.

It is desirable, in some cases, to increase the spacing of secondary amino groups on the polyamide molecule in order to change the reactivity of the polyamide-epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced by molecularly equivalent amount of the diamine. Usually, a replacement of about 50% or less will serve the purpose. Appropriate aminocarboxylic acids containing at least three carbon atoms (e.g., 6-aminohexanoic acid) or lactams thereof (e.g., caprolactam) are also suitable for use to increase spacing in the present invention.

To prepare the prepolymer from diacid and polyalkylenepolyamine, a mixture of the reactants is preferably heated at a temperature of from about 125° C. to about 200° C. for preferably about 0.5 to about 4 hours at atmospheric pressure. Where reduced pressure is employed, lower temperatures such as from about 75° C. to about 150° C. may be used. This polycondensation reaction produces water as a byproduct, which is removed by distillation. At the end of this reaction, the resulting product can be dissolved in water at a concentration of about 50% by weight total polymer solids.

Where diester is used instead of diacid, the prepolymerization can be conducted at a lower temperature, preferably about from about 100° C. to about 175° C. at atmospheric pressure. In this case the byproduct will be an alcohol, the type of alcohol depending upon the identity of the diester. For instance, where a dimethyl ester is employed the alcohol byproduct will be methanol, while ethanol will be the byproduct obtained from a diethyl ester. Where a reduced pressure is employed, lower temperatures such as from about 75° C. to about 150° C. may be used.

In converting the polyamide, as described above, to a cationic thermosetting resin, it is reacted with an epihalohydrin, preferably epichlorohydrin, at a temperature from above about 0° C., preferably from about 15° C. to about 100° C., preferably from about 20° C. to about 80° C., preferably from about 25° C. to about 70° C., or preferably from about 35° C. to about 70° C. until the viscosity of a 20% solids solution at 25° C. has reached about C or higher on the Gardner Holdt scale. Curing agents for wood adhesive formulations may have a Gardner Holdt viscosity of A or B. This reaction is preferably carried out in aqueous solution to moderate the reaction. Although not necessary, pH adjustment can be done to increase or decrease the rate of crosslinking.

When the desired viscosity is reached, sufficient water can be added to adjust the solids content of the resin solution to the desired amount, i.e., about 15% by weight more or less. The product can be cooled to about 25° C. and then stabilized by adding sufficient acid to reduce the pH to less than about 6, preferably less than about 5, or preferably less than about 4 to permit storage by improving the gelation stability. Any suitable inorganic or organic acid such as hydrochloric acid, sulfuric acid, methanesulfonic acid, nitric acid, formic acid, phosphoric acid, and acetic acid may be used to stabilize the product. Non-halogen containing acids, such as sulfuric acid, are preferred.

For wet strength agents, while PAE resins formed in a polyamide/epihalohydrin reaction having molar ratios of epihalohydrin to secondary amine group greater than 2.0 can be used, it is preferred that the molar ratio be less than about 1.5, preferably less than about 1.4. As an example, for a polyamide made with a 1.0 to 1.0 molar ratio of adipic acid to diethylenetriamine, the following formula is used to calculate the molar ratio of epichlorohydrin to secondary amine group: (F11/92.5)/(F9/213.3), where F11 is the epichlorohydrin weight (100% basis) and F9 is the dry weight of poly(adipic acid-co-diethylenetriamine).

PAE resins having low or high azetidinium levels may be treated according to the process of the present invention. To have high effectiveness as a wet strength agent, the azetidinium level in a PAE is preferably maximized. Thus, the azetidinium level of PAE resins treated according to the process of the present invention can be greater than about 35 mole %, preferably greater than about 40 mole %, more preferably greater than about 45 mole %, most preferably greater than about 50 mole % with preferred ranges of from about 40 mole % to about 80 mole %, of from about 40 mole % to about 75 mole %, of from about 45 mole % to about 75 mole %, of from about 45 mole % to about 70 mole %, or of from about 50 mole % to about 75 mole %. The mole percent azetidinium and other species can be determined by $^{13}$C NMR.

In the case of creping agents, it is preferred that the PAE resin comprise a resin formed in a polyamide/epihalohydrin reaction having a molar ratio of epihalohydrin to secondary amine group of less than about 0.50, more preferably less than about 0.25, and can even be lower than 0.1, with a preferred lower limit of about 0.05. Moreover, creping agents according to the present invention do not need as much crosslinking functionalities as wet strength agents, and can therefore have a lower azetidinium level than wet strength agents, Thus, preferably the azetidinium level of creping agents is less than about 10 mole %, with a preferred range of from about 5 mole % to about 10 mole %. The mole percent azetidinium and other species can be determined by $^{13}C$ NMR.

For creping agents derived from prepolymers containing tertiary amine functionality, the creping agent will preferably have a quaternary aminohalohydrin, e.g., aminochlorohydrin, content of less than about 30 mole %, while wet strength agents according to the present invention preferably have a quaternary aminohalohydrin, e.g., aminochlorohydrin, content of greater than about 30 mole %. Moreover, without wishing to be bound by theory, it is believed that secondary amine compounds, such as diethylenetriamine, form azetidinium groups, whereas, tertiary amine type compounds, such as methyl bis(3-aminopropyl)amine, form quaternary aminochlorohydrin groups. Examples of tertiary amine type compounds include, but are not limited to, the reaction product of adipic acid and a methyl bis(3-aminopropyl)amine, which results in a tertiary amine prepolymer. This prepolymer is used to make a tertiary amine based resin which contains quaternary aminohalohydrin groups.

Polyamine-epihalohydrin resins, or compositions thereof, prepared by the process of the present invention can be used without further treatment. However, polyamine-epihalohydrin resins or compositions comprising at least one polyamine-epihalohydrin resin can be treated by various processes prior to and/or subsequent to the membrane separation process of the present invention. For example, polyamine-epihalohydrin resins or compositions comprising at least one polyamine-epihalohydrin resin can be treated by processes to remove AOX species such as epihalohydrins and epihalohydrin by-products, e.g., epichlorohydrin and epichlorohydrin by-products, for example, DCP and CPD in the resin solution. Without limiting the treatments or resins that can be utilized, polyamine-epihalohydrin resins, or compositions thereof may be treated prior to and/or subsequent to the membrane separation process of the present invention with a base ion exchange column, such as disclosed in U.S. Pat. No. 5,516,885 and WO 92/22601; with carbon adsorption, such as disclosed in WO 93/21384; extraction, e.g., ethyl acetate, such as disclosed in U.S. Statutory Invention Registration H1613; or biodehalogenation, such as disclosed in WO 96/40967; U.S. Pat. Nos. 5,470,742; 5,843,763; 5,972,691; 5,871,616; and U.S. application Ser. No. 09/629,629. Moreover, any combination of CPD-forming species reduction or removal processes as disclosed in U.S. Pat. Nos. 6,554,961; 7,175,740; 7,081,512; and U.S. patent application Ser. Nos. 09/592,681, 09/363,224, and 09/330,200 can be performed on PAL resins, or compositions thereof prior to and/or subsequent to subjecting such resins or compositions comprising at least one such resin to the membrane separation process of the present invention.

Prior to or subsequent to undergoing the membrane separation process of the present invention, PAE resins, or compositions thereof can be treated with a basic agent to reduce or remove CPD-forming species. Additionally, an acid treatment after the base treatment can be used to provide enhanced gelation stability. Furthermore, prior to or subsequent to undergoing base treatment, PAE resins, or compositions thereof can be treated by basic ion exchange, ion exchange, biodehalogenation or carbon absorption. Likewise, prior to or subsequent to undergoing acid treatment, PAL resins, or compositions thereof can be treated by basic ion exchange, ion exchange, biodehalogenation, or carbon absorption. When combined with a base treatment, the resulting resin can have very low levels of CPD-forming species, also known as polymer-bound CPD (PB-CPD), in addition to very low levels of DCP, CPD and chloride. Combining the membrane separation process and base treatments can provide a lower cost product and/or further improved performance. Furthermore, such a combination will provide low levels of PB-CPD in addition to very low levels of DCP, CPD and chloride even when the epichlorohydrin to amine ratio is higher than 1.10: 1.0. As to the CPD-forming species, not to be limited by theory, it is believed that the acid groups in, for example, polyaminopolyamides, react with epichlorohydrin during production of, e.g., polyaminopolyamide-epichlorohydrin resins, to form a small amount of chlorohydroxypropyl ester species (hereinafter also referred to as CPD ester) on the resin backbone. Hydrolysis of CPD ester upon aging would yield CPD and regenerate the acid group. FIG. 1 shows this CPD ester formation and hydrolysis.

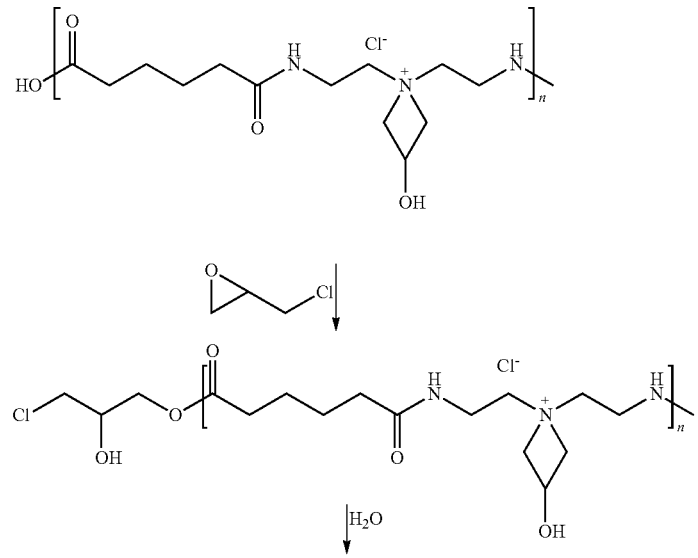

FIG. 1

-continued

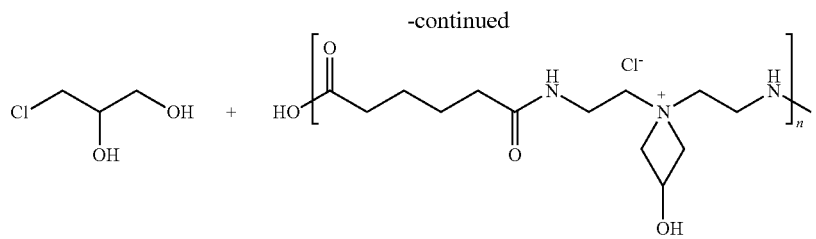

If PAE resins, or compositions thereof are treated with at least one basic agent prior to or subsequent to undergoing the membrane separation process of the present invention, the at least one basic agent is added to the at least one PAE resin or composition thereof under suitable conditions to achieve sufficient hydrolysis of CPD forming species in the at least one PAE resin or composition thereof. Preferably, conditions of time, temperature, pH, starting viscosity, solids content, and ratio of epihalohydrin to amine of the PAE resin are balanced in order to enable the hydrolysis reaction while minimizing degradation of performance of the at least one PAE resin or composition thereof, such as wet strength effectiveness, and preventing undesirably high resin viscosity. Hydrolysis of CPD-forming species can be performed at high solids concentrations by balancing the conditions of time, temperature, pH, starting viscosity, solids content and ratio of epihalohydrin to amine of the PAE resin.

It is noted that the viscosity of the at least one PAE resin or composition thereof can increase or decrease from a starting viscosity during base treatment, and it can remain the same or substantially the same depending upon reaction conditions as noted above. For example, with wet strength agents, it is usually preferred, but not limited to, that the viscosity is maintained or is decreased from the starting viscosity in the initial part of the treatment time and then is maintained or increased to the desired viscosity at the end of the treatment time. For example, with a resin having a starting Brookfield viscosity of about 100 to 300 cps and about 20% to about 22% by weight active solids, it is preferred that conditions are chosen such that after caustic treatment, the resin viscosity is maintained or decreased with the active solids being about 18% to about 20% by weight.

With respect to the above, it is preferred to minimize or at least balance side reactions, such as polymeric breakdown or molecular weight increase in order that the viscosity of the reaction mixture is held below a viscosity that would not enable the reaction to proceed. Preferably, viscosity is measured using a Brookfield LVDV-II+ Programmable Viscometer at 25° C., or an equivalent such as Brookfield DV II+, Spindle LV2 at 60 or 100 rpm, depending on the viscosity. For the programmable viscometer, the procedure used is based on the Operating Instructions, Manual No. M/97-164. This Viscometer will determine viscosity only if the correct spindle and rpm are used for the viscosity of the sample according to instruction manual.

It is further noted that conditions, preferably temperature, pH and concentration of basic agent, can be varied during the reaction. For example, if the viscosity of the reaction mixture is increasing at a rate that is higher than desired, the temperature can be lowered.

The temperature of the base treatment can be at least about 20° C., about 25° C. to about 65° C., about 30° C. to about 60° C., about 35° C. to about 55° C., and preferably about 35° C. to about 50° C. The reaction time can be about 5 minutes to about 3 hours, about 10 minutes to about 2 hours, and about 20 minutes to about 1 hour. The pH can be varied between about 9.5 to about 13, about 10 to about 12.5, about 10.5 to about 13.5 and preferably about 10.5 to about 12.5. The preferred pH values are measured at the preferred temperature range of about 35° C. to about 50° C. The preferred pH values are measured after a 5 minute addition of the basic agent. The pH is preferably allowed to be decreased during the base treatment.

Both organic and inorganic bases can be used for the base treatment. A base is defined as any proton acceptor (see *Advanced Organic Chemistry, Third Ed.*; Jerry March; John Wiley & Sons; New York, 1985, pp. 218-36.). Typical bases include alkali metal hydroxides, carbonates and bicarbonates, alkaline earth metal hydroxides, trialkylamines, tetraalkylammonium hydroxides, ammonia, organic amines, alkali metal sulfides, alkaline earth sulfides, alkali metal alkoxides, alkaline earth alkoxides, and alkali metal phosphates, such as sodium phosphate and potassium phosphate. Preferably, the base will be alkali metal hydroxides, such as lithium hydroxide, sodium hydroxide and potassium hydroxide, or alkali metal carbonates, such as sodium carbonate and potassium carbonate. Most preferably, the base comprises inorganic bases, including sodium hydroxide, potassium hydroxide, and combinations thereof; which are especially preferred for their low cost and convenience.

Thus, the present invention also relates to a process for preparing polyamine-epihalohydrin resins, or compositions thereof having reduced levels of residuals, comprising (a) charging a membrane separation apparatus with an aqueous composition comprising at least one polyamine-epihalohydrin resin; (b) separating said aqueous composition into a permeate and a retentate by passing it through the membrane of said membrane separation apparatus, wherein said retentate comprises an aqueous composition comprising at least one polyamine-epihalohydrin resin having lower levels of residuals on an equal active component basis than the aqueous composition of (a) and wherein said permeate comprises residuals removed from the aqueous composition of (a); and (c) treating the retentate with at least one basic agent under conditions to reduce and/or remove the CPD-forming species, wherein the resulting composition produces less than about 250 ppm dry basis of CPD when stored at pH 1 for 24 hours at 50° C. The permeate resulting from (b) may further comprise less than 5% by weight of the active component of said at least one polyamine-epihalohydrin resin.

The present invention further relates to process for preparing polyamine-epihalohydrin resins having reduced levels of residuals, comprising (a) treating at least one polyamine-epihalohydrin resin with at least one basic agent under conditions to reduce and/or remove CPD-forming species, (b) charging a membrane separation apparatus with an aqueous composition comprising the base-treated at least one polyamine-epihalohydrin resin, and (c) separating said aqueous composition into a permeate and a retentate by passing it through the membrane of said membrane separation apparatus, wherein said retentate comprises an aqueous composition comprising at least one polyamine-epihalohydrin resin having lower levels of residuals on an equal active component basis than the aqueous composition of (a), wherein said permeate comprises residuals removed from the aqueous composition of (a), and wherein the retentate produces less than about 250 ppm dry basis of CPD when stored at pH 1 for 24 hours at 50° C. The permeate resulting from (c) may Anther comprise less than 5% by weight of the active component of said at least one polyamine-epihalohydrin resin.

Subsequent to the base treatment, an acid treatment is preferably employed as described in U.S. Pat. No. 7,081,512, which is incorporated herein by reference in its entirety. The temperature can be at least about 35° C., preferably about 40° C. to about 75° C., even more preferably about 45° C. to about 70° C., even more preferably about 50° C. to about 70° C., even more preferably about 50° C. to about 65° C. The reaction time can be about 20 minutes to about 5 hours, preferably about 30 minutes to 4 about hours, more preferably about 40 minutes to about 3 hours, more preferably about 50 minutes to about 2.5 hours. The preferred treatment temperature and time are inversely related. As the treatment temperature is decreased, the treatment time is preferably increased. It is preferable to have much of the epoxide functionality formed in the base treatment process converted to chlorohydrin functionality in the acid treatment process.

Thus, the present invention additionally relates to a process for preparing polyamine-epihalohydrin resins, or compositions thereof, having reduced levels of residuals, comprising (a) charging a membrane separation apparatus with an aqueous composition comprising at least one polyamine-epihalohydrin resin; (b) separating said aqueous composition into a permeate and a retentate by passing it through the membrane of said membrane separation apparatus, wherein said retentate comprises an aqueous composition comprising at least one polyamine-epihalohydrin resin having lower levels of residuals on an equal active component basis than the aqueous composition of (a) and wherein said permeate comprises residuals removed from the aqueous composition of (a); (c) treating the retentate with at least one basic agent under conditions to at least one of reduce and remove the CPD-forming species, wherein the resulting composition produces less than about 250 ppm dry basis of CPD when stored at pH 1 for 24 hours at 50° C.; and (d) treating the composition resulting from (c) with at least one acidic agent under conditions sufficient to obtain a gelation storage stable composition. The permeate resulting from (b) may filcher comprise less than 5% by weight of the active component of said at least one polyamine-epihalohydrin resin.

The present invention further relates to a process for preparing polyamine-epihalohydrin resins, or compositions thereof, having reduced levels of residuals, comprising (a) treating at least one polyamine-epihalohydrin resin with at least one basic agent under conditions to reduce and/or remove CPD-forming species, (b) treating the base-treated at least one polyamine-epihalohydrin resin from (a) with at least one acidic agent under conditions sufficient to obtain a gelation storage stable composition, (c) charging a membrane separation apparatus with an aqueous composition comprising the acid-treated at least one polyamine-epihalohydrin resin from (b), and (d) separating said aqueous composition into a permeate and a retentate by passing it through the membrane of said membrane separation apparatus, wherein said retentate comprises an aqueous composition comprising at least one polyamine-epihalohydrin resin having lower levels of residuals on an equal active component basis than the aqueous composition of (c), wherein said permeate comprises residuals removed from the aqueous composition of (c), and wherein the retentate produces less than about 250 ppm dry basis of CPU when stored at pH 1 for 24 hours at 50° C. The permeate of resulting from (d) may further comprise less than 5% by weight of the active component of said at least one polyamine-epihalohydrin resin.

The pH of the acid treatment can be varied from about 1.5 to about 3.5, from about 1.8 to 3.5, preferably from about 1.8 to about 3.2, preferably from about 2.0 to about 3.0, even more preferably from about 2.2 to about 2.8. The preferred pH values are measured at 25° C. The preferred acid treatment pH is dependent on the desired viscosity of the resin. As the acid treatment pH increases, within the preferred ranges, the viscosity increases. Without wishing to be bound by theory, this pH and viscosity relationship during the acid treatment process is due to the balance of the crosslinking reactions with the reactions that degrade polymer viscosity. It is preferred that the pH value be maintained during treatment by periodic or continuous addition of the acidic agent. Both organic and inorganic acids can be used herein in the present invention. An acid is defined as any proton donor (see *Advanced Organic Chemistry, Third Ed.*; Jerry March; John Wiley & Sons; New York, 1985, pp. 218-36, incorporated herein by reference.) Suitable acids include hydrochloric acid, sulfuric acid, methanesulfonic acid, nitric acid, formic acid, phosphoric, and acetic acid. Non-halogen containing acids, such as sulfuric acid, are preferred.

Polyamine-epihalohydrin resins, and compositions thereof prepared according to the processes of the present invention have reduced levels of adsorbable organic halogen (AOX). The initial AOX content of polyamine-epihalohydrin resins, or compositions thereof treated according to the processes of the present invention can be reduced to less than about 75% of the initial content, preferably less than about 60% of the initial content, preferably less than about 50% of the initial content, preferably less than about 40% of the initial content, preferably less than about 30% of the initial content, preferably less than about 20% of the initial content, preferably less than about 10% of the initial content of AOX in the untreated resin on an equal actives basis. A Mitsubishi Kasei Corporation instrument (model TOX-10Σ) can be used for the AOX analysis, using the procedure described in the operating manual.

Polyamine-epihalohydrin resins, and compositions thereof, prepared according to the processes of the present invention are capable of being stored without undue formation of CPD. The amount of CPD present can be determined according to the following Acid Test. A container containing a stirrer is charged with a portion of the polyamine-epihalohydrin resin or composition thereof. The pH is adjusted to 1.0 with 96% by weight sulfuric acid. The container is closed and placed in a 50° C. water bath and maintained at 50° C. with stirring. An aliquot is removed from the container at 24 hours and analyzed by gas chromatography (GC) in the manner described below to determine the amount of CPD present, The polyamine-epihalohydrin resins, and compositions thereof, prepared according to the X processes of the present invention can be used to prepare compositions such as wet strength agents, dry strength agents, creping adhesives, and other adhesive compositions. These compositions can be used to prepare various paper products. As such, the present invention further relates to compositions, such as wet strength agents, dry strength agents, creping adhesives, and other adhesive compositions comprising polyamine-epihalohydrin resins, and compositions thereof, prepared according to the processes of the present invention. The present invention also relates to paper products comprising polyamine-epihalohydrin resins, and compositions thereof, prepared according to the processes of the present invention.

The process for making paper using a resin comprising at least one polyamine-epihalohydrin resin, or composition thereof, prepared by the process of the present invention comprises: (a) providing an aqueous pulp suspension; (b) adding to the aqueous pulp suspension at least one polyamine-epihalohydrin resin, or composition thereof prepared by the process of the present invention; and (c) sheeting and drying the aqueous pulp suspension produced in (b) to obtain paper. The aqueous pulp suspension of (a) of the process is obtained by means well known in the art, such as known mechanical, chemical, and semichemical, etc., pulping processes. Normally, after the mechanical grinding and/or chemical pulping step, the pulp is washed to remove residual pulping chemicals and solubilized wood components. Either bleached or unbleached pulp fiber may be utilized in the process of this invention. Recycled pulp fibers are also suitable for use. In (b), at least one polyamine-epihalohydrin resin, or composition thereof prepared by the process of the present invention is added to pulp slurry in a preferable minimum amount of about 0.1% by weight, more preferably about 0.2% by weight, based on the dry weight of the pulp. The preferable maximum amount of resin is about 5% by weight, more preferably about 3% by weight and most preferably about 1.5% by weight. At least one polyamine-epihalohydrin resin, or composition thereof is generally added in the form of an aqueous composition. In addition, other materials normally used in paper may be added in amounts well known in the art, including sizing agents, pigments, alum, brightening agents, dyes, and dry strength agents. (c) is carried out according to procedures well known to those skilled in the art of papermaking.

Paper products comprising at least one polyamine-epihalohydrin resin, or composition thereof prepared by the process of the present invention are capable of being stored without undue formation of CPD. Such paper products can have initial low levels of CPD and can maintain these low levels over an extended period of storage time. Paper products made with a 1% by weight addition level at least one polyamine-epihalohydrin resin, or composition thereof, prepared by the process of the present invention, can contain less than about 600 parts per billion (ppb) of CPD, more preferably less than about 300 ppb of CPD, more preferably less than about 200 ppb of CPD, more preferably less than about 100 ppb of CPD, even more preferably less than about 50 ppb of CPD and even more preferably less than about 10 ppb of CPD, and even more preferably less than about 1 ppb of CPD when stored for periods as long as 2 weeks, preferably as long as at least 6 months, and even more preferably as long as at least one year.

Moreover, paper products made with about a 1% by weight addition level at least one polyamine-epihalohydrin resin, or composition thereof, prepared by the process of the present invention can have an increase in CPD content of less than about 300 ppb, more preferably less than about 200 ppb of CPD, more preferably less than about 100 ppb of CPD, even more preferably less than about 50 ppb of CPD, even more preferably less than about 10 ppb of CPD, and even more preferably less than about 1 ppb of CPD when stored for periods as long as 2 weeks, more preferably as long as at least 6 months, and even more preferably as long as at least one year. In other words, paper products made with at least one polyamine-epihalohydrin resin, or composition thereof, prepared by the process of the present invention have storage stability and will not generate excessive CPD content in paper products when stored as little as one day and for periods of time greater than one year. The polyamine-epihalohydrin resins, or compositions thereof, prepared by the process of the present invention exhibit only minimal formation of CPD in paper products, e.g., packaging board grade, and tissue and towel grade, particularly those paper products exposed to aqueous environments, especially hot aqueous environments, e.g., tea bags, coffee filters, etc. Paper can be made by adding at least one PAE resin, or composition thereof, prepared by the process of the present invention at addition levels other than about 1% by weight, but CPD content should be corrected for the addition level. For example, for a paper product made by adding the resin at a 0.5% by weight addition level having a measured CPD content of 50 ppb, the corrected CPD on a 1% by weight addition level basis will be 100 ppb (50 ppb/0.5% addition level).

To measure CPD in paper products, the paper product is extracted with water according to the method described in European standard EN 647, dated October 1993. Then 5.80 grams of sodium chloride is dissolved into 20 mL of the water extract. The salted aqueous extract is transferred to a 20 gram capacity Extrelut column and allowed to saturate the column for 15 minutes. After three washes of 3 mL ethyl acetate and saturation of the column, the Extrelut column is eluted until 300 mL of eluent has been recovered in about 1 hour. The 300 mL of ethyl acetate extract is concentrated to about 5 mL using a 500 mL Kuderna-Danish concentrating apparatus. If necessary, further concentrating is done by using a micro Kuderna-Danish apparatus. The concentrated extract is analyzed by GC using the procedure and instrumentation described in the Examples section.

Fibrous webs can be creped using polyamine-epihalohydrin resins, or compositions thereof, prepared by the process of the present invention as creping adhesives by: (1) applying creping adhesive comprising at least one polyamine-epihalohydrin resin, or composition thereof, prepared by the process of the present invention to a drying surface for the web or to the web; (2) pressing the fibrous web against the drying surface to effect adhesion of the web to the drying surface; and (3) dislodging the web from the drying surfaces with a creping device such as a doctor blade to crepe the fibrous web. In (1), the creping adhesive is preferably applied to the drying surface for the web. The preferred fibrous web is a cellulosic web. Preferably, the creping adhesive is applied in an aqueous solution containing from about 0.1% by weight to about 10% by weight of the resin or resin composition, more preferably from about 0.25% by weight to about 5% by weight, and most preferably from about 0.5% by weight to about 2% by weight. On a dry weight basis, a minimum amount of about 0.001% by weight, more preferably about 0.005% by weight, and most preferably about 0.01% by weight based on the dry weight of the pulp or paper of creping is used. Preferably, the maximum amount of creping adhesive used is about 2% by weight more preferably about 1% by weight, and most preferably about 0.5% by weight. The drying surface most commonly used in commercial creping operations is a Yankee dryer, and the aqueous composition of adhesive will most often be applied to the creping cylinder or drum by spraying. Alternatively, it can be added by application to the fibrous web, preferably by spraying. In the case of cellulose webs, i.e., paper, the creping adhesive can be added at the wet end of the paper machine by application to the wet web. In some situations it may be possible to add the creping adhesive to the pulp before formation of the sheet. Other ingredients, in particular agents which modify adhesion of the web to the drying surface, can be used in conjunction with creping adhesives comprising at least one polyamine-epihalohydrin resin, or composition thereof prepared by the process of the present invention. Such agents, also known as release agents or plasticizers, include water soluble polyols, glycols, polyethylene glycols, sugars, oligosaccharides, and hydrocarbon oils.

Creping adhesives comprising at least one polyamine-epihalohydrin resin, or composition thereof, prepared by the process of the present invention, are generally sprayed onto the surface of the creping cylinder or drum, usually as an aqueous solution or dispersion. This improves heat transfer, allowing more efficient drying of the sheet. If the pulp furnish sticks too strongly to the creping cylinder, release agents can be sprayed on the cylinder. The release agents are typically hydrocarbon oils. These agents aid in the uniform release of the tissue web at the creping blade, and also lubricate and protect the blade from excessive wear.

Adhesive compositions can be prepared by combining at least one polyamine-epihalohydrin resin, or composition thereof prepared by the process of the present invention wilt a protein and/or lignin. Suitable sources of protein include soy protein, blood meal, feather meal, keratin, gelatin, collagen, gluten, and casein. The protein may be pretreated or modified to improve its solubility, dispersability and/or reactivity. U.S. Pat. Nos. 7,252,735 and 7,060,798 teach the methods of modifying protein and their incorporation into an adhesive. The preferred source of protein is soy. Soy protein can commonly be obtained in the form of soy flour (about 50% by weight protein, dry basis), soy protein concentrate (about 65% by weight protein, dry basis), and soy protein isolate (SPI, at least about 85% by weight percent protein, dry basis). If lignin is used, it may be an industrial lignin such as Kraft lignin, obtained from the Kraft process of making cellulose pulp from wood.

The combination of at least one polyamine-epihalohydrin resin, or compositions thereof, prepared by the process of the present invention and protein and/or lignin is prepared as an aqueous mixture wherein the components are combined and mixed with additional dilution water if required. Other additives may be included in the adhesive formulation such as extenders, viscosity modifiers, defoamers, biocides, and fillers such as wheat flour, tree bark flour, nut shell flour, and corn cob flour. The components of the adhesive formulation are combined in a suitable mixer and are stirred until a homogeneous mixture is obtained. The adhesive compositions are typically prepared with solids contents in the range of about 5% to about 75% by weight, more preferably in the range of about 10% to about 60% by weight, and most preferably in the range of about 20% to about 50% by weight. The most effective ratio of resin to protein and/or lignin in the adhesive composition will depend on the substrate being bonded, the type of protein and/or lignin used, and the physicochemical properties of the resin. The ratio of protein and/or lignin to resin used in adhesive formulations will be preferably in the range of about 100:1 to about 0.1:1, more preferably in the range of about 25:1 to about 0.5:1, and most preferably in the range of about 10:1 to about 1:1.

The pH of the adhesive mixture comprising at least one polyamine-epihalohydrin resin, or compositions thereof, prepared by the process of the present invention can be adjusted to control the reactivity of the thermosetting system. The resins are more reactive in the neutral to alkaline pH range, for example, about pH 6 to about pH 9 and adjusting the pH to this range will give increasing reactivity as the pH ranges from about 6 to about 9. At some point above pH 9, thermosetting reactivity is reduced due to the competing reactions such as hydrolysis of the polymer backbone.

Adhesive compositions comprising at least one polyamine-epihalohydrin resin, or compositions thereof, prepared by the process of the present invention are thermosetting materials and as such are cured by the application of heat and optionally, pressure. Typical temperatures for curing the adhesive compositions are in the range of about 50° C. to about 250° C., more preferably in the range of about 80° C. to about 200° C., and most preferably in the range of about 100° C. to about 150° C. Curing times at these temperatures can range from about 30 seconds to about one hour, more preferably from about one minute to about 30 minutes, and most preferably from about 2 minutes to about 10 minutes.

Adhesive composition comprising at least one polyamine-epihalohydrin resin, or compositions thereof, prepared by the process of the present invention can be added to a suitable substrate in the range of about 1% to about 25% by weight, preferably in the range of about 1% to about 10% by weight, and most preferably in the range of about 2% to about 8% by weight relative to the substrate. Examples of some suitable substrates include, but are not limited to, a lignocellulosic material, pulp, or glass fiber. As stated previously the adhesive composition can be applied by the use of roller coating, knife coating, extrusion, curtain coating, foam coaters, and spray coaters one example of which is the spinning disk resin applicator.

The use of adhesives to prepare lignocellulosic composites is taught in "Wood-based Composite Products and Panel Products", Chapter 10 of Wood Handbook—Wood as an engineering material, Gen. Tech. Rep. FPL-GTR-113, 463 pages, U.S. Department of Agriculture, Forest Service, Forest Products Laboratory, Madison, Wis. (1999). A number of materials can be prepared using adhesive compositions comprising at least one polyamine-epihalohydrin resin, or compositions thereof, prepared by the process of the present invention including particleboard, oriented strand board (OSB), waferboard, fiberboard (including medium-density and high-density fiberboard), parallel strand lumber (PSL), laminated strand lumber (LSL), and other similar products. Lignocellulosic materials such as wood, wood pulp, straw (including rice, wheat or barley), flax, hemp, and bagasse can be used in making thermoset products from the invention. The lignocellulosic product is typically made by blending the adhesive with a substrate in the form of powders, particles, fibers, chips, flakes fibers, wafers, trim, shavings, sawdust, straw, stalks, or shives, and then pressing and heating the resulting combination to obtain the cured material. The moisture content of the lignocellulosic material should be in the range of about 2% to about 20% relative to the total weight of the lignocellulosic material before blending with the adhesive composition.

Adhesive compositions comprising at least one polyamine-epihalohydrin resin, or compositions thereof, prepared by the process of the present invention may also be used to produce plywood or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

In addition to lignocellulosic substrates, adhesive compositions comprising at least one polyamine-epihalohydrin resin, or compositions thereof, prepared by the process of the present invention can be used with substrates such as glass wool, glass fiber, and other inorganic materials. The adhesive compositions can also be used with combinations of lignocellulosic and inorganic substrates.

In order to more clearly describe the present invention, the following non-limiting examples are provided for the purpose of illustration and are not to be construed as limiting the scope of the invention in any way. All parts and percentages in the examples are by weight unless indicated otherwise. ND in the Examples section below indicates "Not Detected."

EXAMPLES

Gas Chromatography (GC) Parameters

GC was used to determine levels of epichlorohydrin and epichorohydrin by-products. Aliquots were absorbed onto an Extrelut column (EM Science, Extrelut QE, Part #901003-1) and extracted with ethyl acetate. A portion of the ethyl acetate solution was then analyzed on a DB-WAX (Megabore, J&W Scientific, Inc.) of 30 m×0.53 mm with 1.5 micron film thickness wide-bore capillary column. An HP Model 5890 series II GC was used. The data system used was either a Millennium 2010 or HP ChemStation. Where a flame ionization detector (FID) (Hewlett-Packard (HP) Model 5890 GC) was used, the components were quantitated using n-octanol as the internal standard. Where an electrolytic conductivity detector (ELCD) (OI Analytical, Model 5220) or a halogen-specific detector (XSD) (OI Analytical, Model 5360 XSD) was used, an external standard method using peak matching quantitation was used. For FID and ELCD detection, the carrier gas was helium at a flow rate of 10 mL/min, The oven program was 35° C. for 7 minutes, followed by ramping at 8° C./min to 200° C. and holding at 200° C. for 5 minutes. The FID used hydrogen at a flow rate of 30 mL/min and air at a flow rate of 400 mL/min at 250° C. The ELCD used n-propanol as the electrolyte with an electrolyte flow rate setting of 50% with a reactor temperature of 900° C. The XSD reactor was operated in an oxidative mode at 1100° C. with a high purity air flow rate of 25 mL/min.

$^1$H NMR Procedure and Parameters (The following procedure was also used for $^{13}$C NMR measurements. The azetidinium value using this method was multiplied by 0.91116 to correlate to the $^{13}$C NMR method. Azetidinium values in the present invention were based on the $^{13}$C NMR method or the correlated $^{13}$C NMR method.)

Sample Preparation:
(1) An approximately 1.5% by weight aqueous solution of phosphoric acid was prepared in a 17 cc vial (approximately 10 cc of $D_2O$).
(2) The solution of (1) (approximately 10 to 20 drops) was added into 100 g of $D_2O$ until a pH of 3.0 to 3.5 was achieved,
(3) Approximately 50 mg of the as-received polyamine-epihalohydrin was weighed in a 5 cc vial.
(4) Approximately 1 cc of phosphoric acid buffered with $D_2O$ (the solution of (2)) was added into the 5 cc vial.
(5) The contents of the vial were mixed using a vortex mixer.
(6) The contents of the vial were transferred into a 5 mm NMR tube using a glass pipette.

The $^1$H NMR spectra were acquired using BRUKER Avance spectrometers equipped with an inverse 5 mm probe. A $^1$H NMR operating frequency of 400 MHz (Avance 400) or 500 MHz (Avance 500) was sufficient for data collection. Electronic integration of the appropriate signals provided molar concentrations of the following alkylation components: polymeric aminochlorhydrins (ACH) and azetidinium ions (AZE). In order to calculate the concentrations of each of these species, the integral values had to be placed on one (1) proton basis. For example, the spectral region between 1.72-1.25 ppm represented four (4) protons from the adipate portion of the diethylenetriamine-adipate backbone, hence the integral value was divided by 4. This value was used as the polymer common denominator (PCD) for calculation of the alkylation species. The chemical shifts of these species were provided below (using an adipate field reference of 1.5 ppm). The corresponding integral value of each alkylation product was used in the numerator for calculation, as illustrated in the examples below:

AZE signal at 4.85-4.52 ppm represented 3 protons, thus, a division factor of 3 was required; integral of AZE÷3÷PCD=mole fraction AZE ACH signal at 68-69 ppm represents 2 AZE protons and 1 ACH proton; integral of ACH-(AZE signal÷3×2)÷PCD=mole fraction ACH The following spectral parameters were standard experimental conditions for $^1$H NMR analysis of PAE-epichlorohydrin resins on the Bruker Avance 400.

| | |
|---|---|
| Temperature | 55° C. |
| Resonance Frequency | 400 MHz |
| # Data Points Acquired | 32K |
| Acquisition Time | 2 seconds |
| Sweep Width | 8278 Hz |
| Number of Scans | 32 |
| Relaxation Delay | 8 seconds |
| Pulse Tip Angle | 90° |
| Pulse Program* | zgpr (presaturation) |
| Processed Spectral Size | 32K |
| Apodization Function | exponential |
| Line Broadening | 0.3 Hz |

Water suppression pulse power level was 80-85 dB-60 Watt 1H transmitter. Excess power would attenuate adjacent signals-USE "SOFT" PULSE $^{13}$C NMR Parameters $^{13}$C NMR spectra were acquired using BRUKER AMX spectrometers equipped with a 10 mm broadband probe. A $^{13}$C NMR operating frequency of 100 MHz (AMX400) or 125 MHz (AMX500) was sufficient for data collection. In either case, the spectra were acquired with continuous $^1$H decoupling. Electronic integration of the appropriate signals provided molar concentrations of the following alkylation components: ACH, EPX, GLY, and AZE, where:
ACH=polymeric aminochlorohydrins
EPX=polymeric epoxides
GLY=polymeric glycols
AZE=azetidinium ions In order to calculate the concentrations of each of these species, the integral values had to be placed on a one (1) carbon basis. For example, the spectral region between 20-42 ppm represented six (6) carbons of the diethylenetriamine-adipate backbone, hence the integral value was divided by six. This value was used as the polymer common denominator (PCD) for calculation of the alkylation species. The chemical shifts of these species were provided below (using an acetonitrile field reference of 1.3 ppm). The corresponding integral value of each alkylation product was used in the numerator for calculation, refer to examples below:

ACH signal at 68-69 ppm represents one carbon; integral of ACH÷PCD=mole fraction ACH GLY signal at 69-70 ppm represents one carbon; integral of GLY÷PCD mole fraction GLY EPX carbon at 51-52 ppm represents one carbon; integral of EPX÷PCD=mole fraction EPX AZE signal at 73-74 ppm represents two carbons, thus, a division factor of two is required; integral of AZE/2÷PCD mole fraction AZE The following spectral parameters were standard experimental conditions for $^{13}$C NMR analysis of Kymene resins or creping agents on the Bruker AMX400;

| | |
|---|---|
| Temperature | 25° C. |
| Resonance Frequency | 100 MHz |
| # Data Points | 64K |
| Dwell Time | 20 microseconds |
| Acquisition Time | 1.3 seconds |
| Sweep Width | 25000 Hz |
| Number of Scans | 1K |
| Relaxation Delay | 3 seconds |
| Pulse Tip Angle | 70 degrees |
| Pulse Program | zgdc |
| Processed Spectral Size | 64K |
| Apodization Function | exponential |
| Line Broadening | 3 Hz |

Comparative Example 1

Kymene® 217LX wet-strength resin was obtained from Hercules Incorporated. This product had low AOX and a low level of CPD-forming species (polymer-bound CPD, PB-CPD), and was manufactured with the technology described in U.S. Pat. No. 7,081,512, which is incorporated herein by reference in its entirety. This sample had a total solids of 21.87%, 45 cps Brookfield viscosity, and a pH of 2.5.

Example 1

For membrane separation, a V-SEP series L unit with XN-45 (polyamide, nominal 150 Dalton cut off) membrane was used. Both were available from New Logic International, Emeryville, Calif. The detailed procedures for this equipment are in the operating manual provided by New Logic International. The feed tank was cooled to maintain the target temperature, typically 15° C. to 25° C. Comparative Example 1 was diluted to 8.5% total solids with water acidified to pH 3 with sulfuric acid and containing 500 ppm of potassium sorbate (as a microbiological preservative) to give a 10 Kg of solution. The V-SEP unit was started and the flow rate was adjusted to 0.5 gal/min. The operating pressure was set to 300 p.s.i. by adjusting pump speed and the back-pressure valves. The temperature was maintained at 15° C. to 25° C. The permeate weight and rate were monitored. Permeate was removed to reduce the retentate weight by half (typically giving 5 Kg of permeate and 5 Kg of remaining retentate), and the retentate was concentrated to 16.35% total solids. Samples of the retentate and permeate were collected and analyzed (see Tables 1 and 3, column heading labeled S).

Chloride Salts Removal Step (Cycle A):

To the retentate was added approximately an equal weight aqueous solution of 2.0% by weight sodium sulfate, acidified to pH 3 with sulfuric acid and containing 500 ppm of potassium sorbate. The weight of this solution was equal to the weight of permeate that was removed from the previous cycle. The permeate weight and rate were monitored. Permeate was removed to equal the weight of the added solution. Samples of the retentate and permeate were collected and analyzed (see Table 1). The total solids of the retentate and the permeate were monitored during the process to confirm the process was functioning properly (e.g., no leak in the membrane) and to provide performance guidance. The above permeate was weighed and an equal weight of an aqueous solution of 2.0% by weight sodium sulfate, acidified to pH 3 with sulfuric acid and containing 500 ppm of potassium sorbate, was added to the above 16.35% solids retentate. The V-SEP unit was started and the flow rate was adjusted to 0.5 gal/min. The operating pressure was set to 300 p.s.i. by adjusting pump speed and the back-pressure valves. The temperature was maintained at 15° C. to 25° C. The permeate weight and rate were monitored. Permeate was removed until the permeate weight equaled the weight of the added 2% aqueous sodium sulfate solution. Samples of the retentate and permeate were collected and analyzed (see Tables 1 and 3). Cycle A was repeated 4 more times. DCP and CPD were also removed during these steps. A cleaning process was initiated on average after every 2 cycles. The cycles before cleaning was dependent on permeate flux rate and operating schedule.

Cleaning Process: The product retentate was removed from the feed tank. An aqueous solution acidified to pH 3 with sulfuric acid and containing 500 ppm of potassium sorbate was added to the feed tank. This aqueous solution optionally contained 2.0% by weight sodium sulfate, depending on the desired process step. The V-SEP unit was started and the flow rate was adjusted to 0.5 gal/min. The operating pressure was set to 300 psi by adjusting pump speed and the back-pressure valve. After running for 5 to 20 minutes, the unit was shut-down. This retentate was saved to use as diluent for the next cycle to minimize loss of product in the system. An aqueous solution of 4% by weight citric acid was added to the feed tank. The V-SEP unit was started and the flow rate was adjusted to 0.5 gal/min. The operating pressure was set to 300 psi by adjusting pump speed and the back-pressure valve. The temperature was allowed to increase, typically to about 25° C. to about 35° C. After running for about 10 to about 30 minutes, the unit was shut-down and the citric acid retentate was discarded. The citric acid was cleaned from the system with 2 cycles of acidified water, typically 5 Kg each. After this cleaning procedure, the product retentate was charged back to the feed tank.

Salts Removal Step (Cycle B):

To the retentate was added water acidified to pH 3 with sulfuric acid and containing 500 ppm of potassium sorbate. The weight of this solution was equal to the weight of permeate that was removed from the previous cycle. The permeate weight and rate were monitored. Permeate was removed to equal the weight of the added solution. Samples of the retentate and permeate were collected and analyzed (see Tables 2 and 4). Cycle B was repeated 4 more times, except the retentate was concentrated in the last cycle by removing 7% more permeate. The permeate from the previous cycle was weighed and an equal weight of water, acidified to pH 3 with sulfuric acid and containing 500 ppm of potassium sorbate, was added to the retentate from the previous cycle. The V-SEP unit was started and the flow rate was adjusted to 0.5 gal/min. The operating pressure was set to 300 p.s.i. by adjusting pump speed and the back-pressure valves. The temperature was maintained at 15° C. to 25° C. The permeate weight and rate were monitored. Permeate was removed until the permeate weight equaled the weight of the added acidified water. Samples of the retentate and permeate were collected and analyzed (see Tables 2 and 4). DCP and CPD were also removed during these steps. A cleaning process was initiated on average after every 2 cycles. The cycles before cleaning was dependent on permeate flux rate and operating schedule.

TABLE 1

| | Comp | | 2% Aq. Sodium Sulfate Cycles | | | | |
|---|---|---|---|---|---|---|---|
| Retentates | Ex 1 | S | 1 | 2 | 3 | 4 | 5 |
| Total Solids % | 21.87 | 16.35 | 16.50 | 16.88 | 17.45 | 18.50 | 19.88 |
| DCP (ppm) | 963 | 342 | 176 | 82 | 39 | 22 | 5.0 |
| CPD (ppm) | 645 | 246 | 119 | 55 | 27 | 14 | 3.7 |
| Sodium (wt %) | 1.22 | 0.98 | 0.97 | 0.99 | 1.10 | 1.09 | 1.23 |
| Chloride (wt %) | 1.72 | 0.76 | 0.46 | 0.27 | 0.09 | 0.11 | 0.06 |
| Sulfate (wt %) | 3.02 | 2.91 | 3.25 | 3.60 | 3.93 | 4.15 | 4.61 |

TABLE 2

| | Acidified Water Cycles | | | | |
|---|---|---|---|---|---|
| Retentates | 1 | 2 | 3 | 4 | 5 |
| Total Solids % | 19.04 | 18.27 | 17.59 | 17.62 | 20.37 |
| DCP (ppm) | 2.0 | 0.9 | 0.4 | 0.2 | 0.1 |
| CPD (ppm) | 1.4 | 0.6 | 0.3 | 0.1 | 0.1 |
| Sodium (wt %) | 0.57 | 0.25 | 0.11 | 0.05 | 0.02 |
| Chloride (wt %) | 0.04 | 0.04 | 0.04 | 0.04 | 0.05 |
| Sulfate (wt %) | 3.61 | 2.93 | 2.70 | 2.63 | 2.96 |

TABLE 3

| | | 2% Aq. Sodium Sulfate Cycles | | | | |
|---|---|---|---|---|---|---|
| Permeates | S | 1 | 2 | 3 | 4 | 5 |
| Total Solids % | 2.08 | 2.10 | 1.80 | 1.66 | 1.78 | 1.68 |
| DCP (ppm) | 364 | 176 | 90 | 37 | 22 | 5.4 |
| CPD (ppm) | 260 | 130 | 65 | 27 | 14 | 4.1 |
| Sodium (wt %) | 0.70 | 0.71 | 0.61 | 0.56 | 0.60 | 0.56 |
| Chloride (wt %) | 0.51 | 0.32 | 0.19 | 0.11 | 0.06 | 0.03 |
| Sulfate (wt %) | 0.78 | 1.02 | 0.97 | 1.01 | 1.12 | 1.11 |
| Actives (TS—Na—Cl—$SO_4$) | 0.09 | 0.05 | 0.03 | −0.02 | 0.00 | −0.02 |
| % Loss of Actives | 1.34 | 0.77 | 0.41 | −0.33 | 0.07 | −0.33 |

TABLE 4

| | Acidified Water Cycles | | | | |
|---|---|---|---|---|---|
| Permeates | 1 | 2 | 3 | 4 | 5 |
| Total Solids % | 0.94 | 0.52 | 0.26 | 0.14 | 0.08 |
| DCP (ppm) | 2.1 | 1.0 | 0.4 | 0.2 | 0.1 |
| CPD (ppm) | 1.5 | 0.6 | 0.2 | 0.1 | 0.1 |
| Sodium (wt %) | 0.31 | 0.16 | 0.08 | 0.03 | 0.02 |
| Chloride (wt %) | 0.02 | 0.01 | <0.01 | <0.01 | <0.01 |
| Sulfate (wt %) | 0.63 | 0.37 | 0.19 | 0.14 | 0.09 |
| Actives (TS—Na—Cl—$SO_4$) | −0.02 | −0.02 | −0.01 | −0.03 | −0.03 |
| % Loss of Actives | −0.21 | −0.34 | −0.12 | −0.47 | −0.36 |

DCP, CPD, and inorganic chloride can be reduced to any level desired, including to very low levels with minimal loss of active component. Salts can be removed and chloride salts can be exchanged with sulfate salts. Since the polymer is cationic, anionic counterions are needed.

Note that for the first four 2% aqueous sodium sulfate cycles, the FID detector was used for DCP and CPD analyses. At levels lower than 50 ppm, the XSD detector typically provides more accurate data. Therefore, the bigger drop than predicted from the fourth to the fifth 2% aqueous sodium sulfate cycle is likely due to differences in detector accuracy.

Example 2

Experiments were conducted using a process similar to Example 1, except no aqueous sodium sulfate cycles and PPD D-1282 (16.1% by weight total solids, available from Hercules Incorporated) were used as the resin instead of Kymene® 217LX. PPD D-1282 was diluted 1:1 with water and concentrated to original starting volume in a discontinuous diafiltration process using a XN-45 membrane. This dilute-concentrate process was repeated six times. The results are presented below in Tables 5 and 6. DCP and CPD were reduced by about half on each pass. Reduction of salt content was less than half due to partial retention with this membrane.

TABLE 5

| Description | Volume of $H_2O$ | % Total Solids | 1,3-DCP (ppm) | 3-CPD % (ppm) | Weight Na | Weight % Cl |
|---|---|---|---|---|---|---|
| PPD D-1282 feed | 0 | 16.1 | 37 | 145 | 1.314 | 1.280 |
| Retentate | 1 | 13.9 | 18 | 66 | 0.769 | 0.790 |
| Retentate | 2 | 13.2 | 10 | 40 | 0.375 | 0.550 |
| Retentate | 3 | 12.9 | 5 | 19 | 0.222 | 0.420 |
| Retentate | 4 | 13.0 | <3 | 10 | 0.118 | 0.350 |
| Retentate | 5 | 13.0 | ND | 5 | 0.063 | 0.290 |
| Retentate | 6 | 14.9 | ND | <3 | 0.032 | 0.290 |
| Permeate | 1 | 1.81 | 18 | 75 | 0.540 | 0.500 |
| Permeate | 2 | 1.03 | 10 | 40 | 0.321 | 0.280 |
| Permeate | 3 | 0.56 | 6 | 21 | 0.200 | 0.160 |
| Permeate | 4 | 0.33 | <3 | 11 | 0.120 | 0.100 |
| Permeate | 5 | 0.13 | ND | 5 | 0.065 | 0.061 |
| Permeate | 6 | 0.075 | ND | <3 | 0.034 | 0.038 |

TABLE 6

| Description | Weight % Sulfate | % Active[1] | % Loss Active[2] | % Active[3] | % Loss Active[4] |
|---|---|---|---|---|---|
| PPD D-1282 feed | 2.70 | 12.50 | — | — | — |
| Retentate | 2.16 | 10.61 | — | — | — |
| Retentate | 1.86 | 10.38 | — | — | — |
| Retentate | 1.72 | 10.46 | — | — | — |
| Retentate | 1.67 | 11.56 | — | — | — |
| Retentate | 1.64 | 10.53 | — | — | — |
| Retentate | 1.85 | 12.26 | — | — | — |
| Permeate | 0.57 | 0.17 | 3.11 | 0.20 | 3.77 |
| Permeate | 0.34 | 0.09 | 1.98 | 0.09 | 2.02 |
| Permeate | 0.21 | 0.06 | 1.45 | −0.01 | −0.23 |
| Permeate | 0.13 | 0.04 | 0.85 | −0.02 | −0.41 |
| Permeate | 0.063 | 0.16 | 3.36 | −0.06 | −1.21 |
| Permeate | 0.032 | 0.16 | 3.12 | −0.03 | −0.56 |

[1]Calculated from measured % nitrogen and assumes 12.5% active for PPD D-1282 feed.
[2]Calculated from % Active[1] of feed considering sequential dilution by half and % Active[1] of sample.
[3]Calculated by subtracting all the measured salts from the total solids.
[4]Calculated from % Active[3] considering sequential dilution by half and % Active[1] of sample.

Example 3

Experiments were conducted using a process similar to Example 2 except 3 different membrane types were used. PPD D-1282 was diluted 1:1 with water. The results are presented below in Table 7. DCP and CPD were reduced by about half and salt was partially retained with minimal loss of active component. The loss of active component was affected by membrane type.

TABLE 7

| Description | % Total Solids | Wt % Na | 1,3-DCP (ppm) | 3-CPD (ppm) | Wt % Chloride | Wt % Sulfate | % Active[1] | % loss Active[2] |
|---|---|---|---|---|---|---|---|---|
| PPD D-1282 | 16.20 | 1.20 | 40 | 153 | 1.25 | 2.77 | — | — |
| Se 1 R0 conc. | 15.05 | 0.66 | 22 | 89 | 0.84 | 2.21 | — | — |
| SR2 conc. | 15.33 | 0.789 | 20 | 76 | 0.80 | 2.52 | — | — |
| SR3 conc. | 15.08 | 0.946 | 18 | 77 | 0.90 | 2.55 | — | — |
| Se 1 R0 permeate | 1.80 | 0.539 | 17 | 70 | 0.44 | 0.63 | 0.19 | 3.06 |
| SR2 permeate | 1.49 | 0.475 | 21 | 86 | 0.54 | 0.37 | 0.11 | 1.68 |
| SR3 permeate | 0.74 | 0.262 | 20 | 77 | 0.34 | 0.15 | −0.01 | −0.19 |

[1]Calculated by subtracting all the measured salts from the total solids.
[2]Calculated from % Active[1] considering the PPD D-1282 feed was diluted by half.

Example 4

The paper strength performance using Retentate D-1282, 5 volumes of water (see Tables 5 and 6) from Example 2 was compared to those using two products, Kymene® G3-X wet-strength resin and Kymene® 557H, available from Hercules Incorporated. Table 8 shows that membrane separation did not negatively affect the strength performance of the additive.
Papermaking and Testing Procedure:
Experimental Parameters:

| Pulp: 70%/30% ECF bleached hardwood (Celbi PP)/softwood (Lapponia Pine) | |
|---|---|
| Process water: | |
| Hardness: | 100 ppm $CaCO_3$ |
| Alkalinity: | 50 ppm $CaCO_3$ |
| pH: | 7.2 |
| Temperature: | 38° C. |
| Refining: | Pilâo single disc refiner |
| Time & Energy: | 13 minutes at 35 A |
| Freeness: | 31° SR |
| Consistency: | 1.8% |
| Paper was made on the Barneveld Pilot Paper Machine (BPM) | |
| Grammage: | 65 g/m² |
| Speed: | 5.0 m/min. |
| Pressure Wet Press: | 2.4 bar |
| Dry Content after Press: | 40.0% |
| Drying Cylinders Temperatures: | 55, 75, 95, 105, 20, 20° C. |
| Paper Moisture Content: | 3.2% |

Paper Testing:

GRAMMAGE

The samples were die-cut with an area of 100 cm². These samples were measured on an analytical balance.

CALIPER (micron)

The caliper was measured with the Messmer Büchel Micrometer model M372200.

TENSILE STRENGTH (kN/m)

The tensile strength was measured with a Zwick tensile tester, crosshead speed of 20 mm/min., paper single ply and 15 mm wide. For wet tensile, the paper was soaked for 2 hours in demineralized water. The dry tensile was measured in the Machine Direction (MD) and in the Cross Direction (CD). The samples were Oven Cured (OC) for 30 min. at 80° C. in an oven.

TABLE 8

Paper Properties and Strength Performance for Example 2.

| Run # | Additive | Addition Level % dry basis | Grammage lab g/m² | Caliper μm | Density kg/m3 | Tensile Strength(kN/m) OC (30' @ 80° C.) dry (MD) | wet (MD) | w/d % | dry (CD) |
|---|---|---|---|---|---|---|---|---|---|
| 1 | Blank | — | 71.3 | 126 | 566 | 3.76 | 0.03 | 0.73 | 2.08 |
| 2 | Kymene G3-X | 0.25 | 69.5 | 120 | 581 | 4.34 | 0.51 | 11.76 | 2.54 |
| 3 | Kymene G3-X | 0.50 | 71.0 | 122 | 581 | 4.55 | 0.69 | 15.08 | 2.66 |
| 4 | Kymene G3-X | 0.75 | 69.2 | 119 | 580 | 4.67 | 0.85 | 18.19 | 2.79 |
| 5 | Kymene G3-X | 1.00 | 67.7 | 119 | 569 | 4.59 | 0.93 | 20.22 | 2.71 |
| 6 | Example 2 | 0.25 | 68.1 | 117 | 584 | 4.33 | 0.54 | 12.41 | 2.53 |
| 7 | Example 2 | 0.50 | 70.1 | 120 | 585 | 4.58 | 0.74 | 16.20 | 2.76 |
| 8 | Example 2 | 0.75 | 70.0 | 120 | 582 | 4.90 | 0.91 | 18.63 | 2.89 |
| 9 | Example 2 | 1.00 | 70.8 | 120 | 592 | 5.33 | 1.06 | 19.96 | 3.02 |
| 14 | Kymene 557H | 0.25 | 68.6 | 114 | 600 | 4.93 | 0.67 | 13.51 | 2.73 |

TABLE 8-continued

Paper Properties and Strength Performance for Example 2.

| Run # | Additive | Addition Level % dry basis | Grammage lab g/m² | Caliper μm | Density kg/m3 | Tensile Strength(kN/m) OC (30' @ 80° C.) | | | dry (CD) |
|---|---|---|---|---|---|---|---|---|---|
| | | | | | | dry (MD) | wet (MD) | w/d % | |
| 15 | Kymene 557H | 0.50 | 69.2 | 118 | 587 | 5.15 | 0.98 | 19.01 | 2.88 |
| 16 | Kymene 557H | 0.75 | 68.1 | 116 | 585 | 5.26 | 1.10 | 20.97 | 3.03 |
| 17 | Kymene 557H | 1.00 | 67.9 | 116 | 586 | 5.18 | 1.20 | 23.19 | 2.93 |
| 18 | Blank | — | 67.4 | 115 | 588 | 4.21 | 0.03 | 0.81 | 2.41 |

Example 5

Membranes from several manufacturers were tested in a V-SEP series Model L test unit available from New Logic International, Emeryville, Calif. The detailed procedures for this equipment are in the operating manual provided by New Logic International. Kymene® 217LX was diluted to two concentration levels, A (total solids approximately 5.5%) and B (total solids approximately 16%). Permeate and retentate were recycled so that feed concentration would not change. Feed was delivered to the membrane at 25° C. and 25 bar. Data collected over an eight hour period indicated fouling was minimal. Data in Table 9 demonstrates that all membranes were chloride selective. Some membranes were more effective at removing chlorides than others. DCP and CPD levels were consistent with the level of Kymene® 217LX dilution.

3. Ability to generate adequate membrane flux over a wide concentration range was observed.
4. Various operating modes including continuous and modified batch were found to be acceptable.
5. Ability to process high solids feed was demonstrated.
6. Membrane cleaning was critical to maintaining membrane performance. Cleaning protocols were found to be acceptable for commercial operation.
7. Yield loss was found to be minimal, generally less than 0.3 weight percent.

For Example 6, Kymene® G3140 wet-strength resin (PPD D-1282) with 110 ppm CPD was diluted with water to 42 ppm CPD. Diluted Kymene® G3140 was concentrated back to the same active polymer as the feed with a Koch SR3 nanofiltration membrane. Chloride content was reduced by about 47%. The results are presented below in Tables 10, 11, and 12.

TABLE 9

| Sample | Membrane Type | % Total Solids | Oven % Ash | Electr % Ash | DCP (ppm) | CPD (ppm) | Weight Percent | | | Total Salt | Cl/SO₄ Ratio |
|---|---|---|---|---|---|---|---|---|---|---|---|
| | | | | | | | Na | Cl | SO₄ | | |
| Conc. A | N/A | 7.02 | 0.97 | 1.2 | 215 | 145 | 0.359 | 0.570 | 0.955 | 1.884 | 0.60 |
| Perm. A | Filmtec | 0.5 | 0.29 | 0.5 | 195 | 115 | 0.185 | 0.275 | 0.100 | 0.560 | 2.75 |
| Perm. A | Filmtec B | 0.39 | 0.29 | 0.4 | 180 | 110 | 0.144 | 0.240 | 0.080 | 0.464 | 3.00 |
| Perm. A | Osmonics | 0.63 | 0.33 | 0.6 | 205 | 145 | 0.240 | 0.365 | 0.140 | 0.745 | 2.61 |
| Perm. A | SR3 Koch | 0.62 | 0.39 | 0.5 | 210 | 120 | 0.216 | 0.300 | 0.125 | 0.641 | 2.40 |
| Conc. B | N/A | 17.63 | 2.38 | 2.8 | 540 | 370 | 0.977 | 1.330 | 2.280 | 4.587 | 0.58 |
| Perm. B | Filmtec | 1.81 | 1.43 | 1.8 | 520 | 385 | 0.681 | 0.825 | 0.280 | 1.786 | 2.95 |
| Perm. B | Filmtec B | 1.56 | 0.94 | 1.6 | 530 | 370 | 0.588 | 0.845 | 0.110 | 1.543 | 7.68 |
| Perm. B | Osmonics | 2.56 | 2.15 | 2.6 | 525 | 410 | 0.915 | 1.095 | 0.460 | 2.470 | 2.38 |
| Perm. B | SR3 Koch | 1.94 | 1.63 | 2 | 550 | 420 | 0.732 | 0.975 | 0.225 | 1.932 | 4.33 |
| Feed A | N/A | 19.72 | 2.25 | 2.8 | 600 | 435 | 1.060 | 1.495 | 2.465 | 5.020 | 0.61 |
| Permeate | Osmonics | 2.79 | 2.35 | 2.90 | 595 | 450 | 1.000 | 1.215 | 0.565 | 2.780 | 2.15 |
| Permeate | Seahan 70 | 2.79 | 2.38 | 2.70 | 530 | 390 | 0.846 | 0.790 | 0.720 | 2.356 | 1.10 |
| Feed A | N/A | 6.55 | 0.92 | 1.10 | 220 | 145 | 0.361 | 0.575 | 0.895 | 1.831 | 0.64 |
| Permeate | Seahan 70 | 0.71 | 0.37 | 0.70 | 210 | 120 | 0.235 | 0.275 | 0.235 | 0.745 | 1.17 |

Examples 6 and 7

Kymene® G3140 (PPD D-1282) and Kymene® 621 were processed with nanofiltration membranes from Koch Membrane Systems in a pilot unit with 240 ft² membrane area. 30 process runs were conducted. The following results were obtained from pilot membrane testing:
1. Ability to remove DCP and CPD was demonstrated.
2. Salt removal characteristics were determined.

For Example 7, Kymene® 621 at 21% solids was processed with a nanofiltration membrane in modified batch mode. DCP was reduced from 10500 ppm to 925 ppm and CPD was reduced from 2300 ppm to 190 ppm. Chloride decreased by 14%. Repeating the process but using aqueous sodium sulfate as the solvent resulted in the chloride content being reduced by 77%. The results in Table 13 indicate residuals and chloride levels can be decreased to the desired target level.

TABLE 10

| Description | % Total Solids | pH | V | 1,3-DCP (ppm) | 3-CPD (ppm) |
|---|---|---|---|---|---|
| Reactor PPD D-1282 | 17.03 | 2.19 | 41.4 | 16 | 110 |
| Tank PPD D-1282 | 16.66 | 2.19 | 39.3 | 17 | 110 |
| Diluted PPD D-1282 | 6.09 | 2.40 | 10.3 | 7 | 44 |
| Final Permeate | 1.58 | 2.33 | — | 6 | 44 |
| Final Retentate | 14.89 | 2.60 | 37.8 | 6 | 43 |
| Final Permeate | 1.31 | 2.38 | — | 6 | 43 |
| Final Retentate | 15.74 | 2.64 | 39.5 | 7 | 41 |
| Final Permeate | 1.30 | 2.37 | — | 6 | 43 |
| Final Retentate | 12.23 | 2.64 | 21.6 | 6 | 43 |
| Final Permeate | 1.13 | 2.34 | — | 6 | 42 |
| Final Retentate | 12.33 | 2.62 | 21.5 | 6 | 41 |
| Final Permeate | 1.19 | 2.38 | — | 6 | 44 |
| Final Retentate | 15.29 | 2.68 | 32.3 | 6 | 44 |
| Final Permeate | 0.88 | 2.55 | — | 4 | 29 |
| Final Retentate | 14.86 | 2.88 | 32.6 | 4 | 27 |
| Final Permeate | 0.91 | 2.50 | — | 5 | 30 |
| Final Retentate | 13.76 | 2.80 | 27.8 | 5 | 30 |
| Final Permeate | 0.95 | 2.49 | — | 4 | 29 |
| Final Retentate | 18.58 | 2.87 | 57.2 | 5 | 27 |

V = Brookfield viscosity (cps)

TABLE 11

| Description | Weight Percent Na | Cl | $SO_4$ | 1 | 2 | $Cl/SO_4$ |
|---|---|---|---|---|---|---|
| Reactor PPD D-1282 | 1.30 | 1.350 | 3.27 | — | | 0.41 |
| Tank PPD D-1282 | 1.27 | 1.310 | 3.13 | — | | 0.42 |
| Diluted PPD D-1282 | 0.507 | 0.480 | 1.18 | — | | 0.41 |
| Final Permeate | 0.615 | 0.410 | 0.60 | −0.04 | −1.00 | 0.68 |
| Final Retentate | 0.763 | 0.690 | 2.46 | — | | 0.28 |
| | | | | | | 0.26 |
| Final Permeate | 0.533 | 0.380 | 0.49 | −0.08 | −1.86 | 0.82 |
| Final Retentate | 0.637 | 0.700 | 2.60 | — | | 0.28 |
| | | | | | | 0.27 |
| Final Permeate | 0.444 | 0.38 | 0.47 | −0.05 | −1.07 | 0.92 |
| Final Retentate | 0.637 | 0.68 | 2.10 | — | | 0.31 |
| Final Permeate | 0.406 | 0.37 | 0.40 | −0.05 | −1.02 | 0.93 |
| Final Retentate | 0.674 | 0.69 | 2.14 | — | | 0.32 |
| Final Permeate | 0.404 | 0.36 | 0.42 | 0.01 | 0.13 | 0.86 |
| Final Retentate | 0.605 | 0.77 | 2.49 | — | | 0.31 |
| Final Permeate | 0.294 | 0.250 | 0.33 | 0.01 | 0.13 | 0.76 |
| Final Retentate | 0.45 | 0.580 | 2.31 | — | | 0.25 |
| Final Permeate | 0.314 | 0.260 | 0.35 | −0.01 | −0.31 | 0.74 |
| Final Retentate | 0.496 | 0.570 | 2.19 | — | | 0.26 |
| Final Permeate | 0.310 | 0.270 | 0.35 | 0.02 | 0.44 | 0.77 |
| Final Retentate | 0.436 | 0.620 | 2.74 | — | | 0.23 |

1 = % Active (TS + Na + Cl + $SO_4$)
2 = % Loss Active

TABLE 12

| Description | % Total Solids | pH | V | 1,3-DCP (ppm) | 3-CPD (ppm) | Weight Percent Na | Cl | $SO_4$ | Mw (Daltons) |
|---|---|---|---|---|---|---|---|---|---|
| Tank PPD D-1282 | 16.65 | 2.33 | 70.6 | 33 | 117 | 1.32 | 1.330 | 3.15 | 247350 |
| Final Permeate | 0.68 | 2.26 | — | 6 | 27 | 0.231 | 0.240 | 0.22 | |
| Final Retentate | 13.31 | 2.68 | 36.5 | 6 | 32 | 0.611 | 0.590 | 2.29 | 272711 |
| Final Permeate | 0.84 | 2.42 | — | 8 | 34 | 0.293 | 0.260 | 0.29 | |
| Final Retentate | 13.78 | 2.82 | 39 | 7 | 36 | 0.606 | 0.590 | 2.33 | |
| Final Permeate | 0.63 | 2.36 | — | 6 | 30 | 0.229 | 0.230 | 0.20 | |
| Final Retentate | 13.60 | 2.82 | 32.5 | 7 | 33 | 0.644 | 0.590 | 2.36 | 271243 |
| Final Permeate | 0.63 | 2.35 | — | 6 | 29 | 0.236 | 0.240 | 0.23 | |
| Final Retentate | 13.61 | 2.81 | 32.7 | 7 | 34 | 0.628 | 0.610 | 2.30 | 274877 |
| Tank PPD D-1282 | 16.36 | 2.30 | 34.3 | 29 | 119 | 1.36 | 1.290 | 3.07 | 189442 |
| Tank PPD D-1282 | 16.32 | 2.27 | 36.8 | 30 | 118 | 1.38 | 1.280 | 3.04 | 239916 |
| Final Permeate | 0.76 | 2.37 | — | 9 | 36 | 0.30 | 0.250 | 0.28 | |
| Final Retentate | 15.06 | 2.78 | 35.3 | 9 | 35 | 0.66 | 0.600 | 2.53 | 198038 |
| Final Permeate | 0.60 | 2.32 | — | 8 | 29 | 0.24 | 0.210 | 0.19 | |
| Final Retentate | 15.55 | 2.77 | 37.5 | 9 | 32 | 0.71 | 0.670 | 2.80 | 197586 |

TABLE 13

| Description | % Total Solids | pH | V | 1,3-DCP (ppm) | 3-CPD (ppm) | Weight Percent Na | Cl | $SO_4$ |
|---|---|---|---|---|---|---|---|---|
| Kymene 621 H41207K03N | 21.04 | 3.12 | 155.0 | 10027 | 2248 | <0.001 | 1.690 | 0.71 |
| Diluted Kymene 621 | 5.64 | 3.08 | 16.2 | 2715 | 648 | 0.048 | 0.470 | 0.30 |
| Final Retentate modified batch | 19.31 | 4.18 | 105.0 | 645 | 107 | 9 ppm | 1.540 | 0.69 |
| Final Retentate modified batch Sodium sulfate added to the diafiltration water | 18.79 | 3.74 | 59.8 | 925 | 191 | 0.602 | 0.410 | 3.16 |

Example 8

PPD D-1428, a polyaminopolyamide-epichlorohydrin resin available from Hercules Incorporated, was processed in a 3 stage nanofiltration membrane system from GeaFiltration. The feed at 19.8% total solids with a DCP content of 4240 ppm and CPD content of 570 ppm was diluted to 2.9% solids with water. Diluted feed was concentrated using a nanofiltration membrane with an operating pressure of 25 bar and an operating temperature of 26° C. in a single pass, continuous 3 stage process. Permeate from each stage was discarded while retentate flowed from one stage to the next in series. The ratio of retentate volumetric flow rate to feed volumetric flow rate was adjusted to give the desired retentate percent solids. Final retentate concentration was 19.7% solids with a DCP content of 530 ppm and a CPD content of 80 ppm. This example demonstrates residuals can be efficiently decreased from a very high level in a high azetidinium "Generation 1" resin to the desired target level while achieving the target solids.

Example 9

PPD D-1430, a caustic-treated polyaminopolyamide-epichlorohydrin resin available from Hercules Incorporated manufactured with the technology described in U.S. Pat. No. 7,081,512, was processed in a 3 stage nanofiltration membrane system from GeaFiltration. The feed at 24.7% total solids, with a DCP content of 1300 ppm and CPD content of 990 ppm was diluted to 14.6% total solids. Diluted feed was concentrated using a nanofiltration membrane with an operating pressure average of 25 bar and an operating temperature of 27° C. in a single pass, continuous 3 stage process. Permeate from each stage was discarded while retentate flowed from one stage to the next in series. The ratio of retentate volumetric flow rate to feed volumetric flow rate was adjusted to give the desired retentate percent solids. Final retentate concentration was 24.2% total solids with a DCP content of 630 ppm and a CPD content of 335 ppm. This example demonstrates that a batch process can achieve the desired reduction of 1,3-DCP, 3-CPD, and chloride residuals.

Example 10

PPD D-1430, a caustic-treated polyaminopolyamide-epichlorohydrin resin available from Hercules Incorporated manufactured with the technology described in U.S. Pat. No. 7,081,512, was processed in a single stage nanofiltration membrane system from GeaFiltration. The PPD D-1430 was diluted to provide a feed at 19.8% total solids, with a DCP content of 930 ppm was diafiltered with 0.55 volumes of water and then concentrated using a nanofiltration membrane with an average operating pressure average of 20.5 bar and an operating temperature of 26° C. in batch mode. Retentate was recycled and combined with membrane feed and diafiltration water until the desired level of DCP was achieved in retentate. After diafiltration, retentate was concentrated by recycling retentate to feed tank with no diafiltration water addition until the desired active polymer solids were achieved. Final retentate concentration was 24.8% solids, with a DCP content of 540 ppm. This final retentate was diluted to 22.65% total solids and the pH was adjusted with sulfuric acid and formic acid. Table 14 shows that the azetidinium (Aze) level of the diluted retentate was only slightly lower than that of starting PPD D-1430 while achieving the desired reduction of 1,3-DCP, 3-CPD, and chloride residuals by using a diafiltration process.

TABLE 14

| Designation | Description | % Total Solids | pH | Visc. (cps) | 1,3-DCP (ppm) | 3-CPD (ppm) | Weight Percent | | | Cl/ SO4 | Aze (CNMR) |
| | | | | | | | Na | Cl | SO$_4$ | | |
| --- | --- | --- | --- | --- | --- | --- | --- | --- | --- | --- | --- |
| X34143-70-3 | PPD D-1430 | 24.16 | 2.62 | 96.8 | 1176 | 963 | 1.68 | 2.21 | 3.87 | 0.57 | 60.7 |
| X34143-70-5 | Diluted Retentate | 22.65 | 2.85 | 93.4 | 559 | 430 | 0.94 | 1.13 | 3.24 | 0.35 | 59.6 |

Example 11

PPD D-1430, a caustic-treated polyaminopolyamide-epichlorohydrin resin available from Hercules Incorporated manufactured with the technology described in U.S. Pat. No. 7,081,512, was processed in a single stage nanofiltration membrane system from GeaFiltration. Feed at 19.3% total solids containing 3.7% salts and 15.6% active polymer solids, with a DCP content of 930 ppm was diafiltered with 5.8 volumes of water and then concentrated using a nanofiltration membrane with an average operating pressure average of 21.5 bar and an operating temperature of 25° C. in batch mode. The diafiltration water was added continuously to the feed tank to maintain a constant volume. Retentate was recycled and combined with membrane feed and diafiltration water until the desired level of DCP was achieved in retentate. After diafiltration, the retentate was concentrated by recycling retentate to feed tank with no diafiltration water addition until the desired active polymer solids were achieved. The final retentate was 19.7% solids and contained non-detected levels of sodium and had a DCP content of 3.2 ppm. This example demonstrates that the present invention can achieve very low levels of residuals using a continuous diafiltration process.

The invention claimed is:
1. A process for preparing polyamine-epihalohydrin resins having reduced levels of residuals comprising:
   (a) charging a membrane separation apparatus with an aqueous composition comprising at least one polyamine-epihalohydrin resin; and
   (b) separating said aqueous composition into a permeate and a retentate by passing said aqueous composition through the membrane of said membrane separation apparatus,
   wherein said retentate comprises an aqueous composition comprising at least one polyamine-epihalohydrin resin having lower levels of residuals on an equal active component basis than the aqueous composition of (a), and
   wherein said membrane is a polyamide nanofiltration membrane having a nominal cut off range of 150 Daltons to 1000 Daltons thereby providing said permeate with residuals removed from the aqueous composition of (a) and less than 5% by weight of the active component of said at least one polyamine-epihalohydrin resin.

2. The process of claim 1, wherein said residuals are selected from the group consisting of epichlorohydrin, DCP, CPD, salts, low molecular weight species, and combinations thereof.

3. The process of claim 2, wherein said salts comprise chloride ions.

4. The process of claim 1, wherein said polyamine-epihalohydrin resin comprises polyaminopolyamide-epichlorohydrin resin.

5. The process of claim 1, wherein the CPD content of the polyamine-epihalohydrin resins having reduced levels of residuals is less than about 50 ppm at 12.5% active component of said at least one polyamine-epihalohydrin resin.

6. The process of claim 1, wherein the DCP content of the polyamine-epihalohydrin resins having reduced levels of residuals is less than about 100 ppm at 12.5% active component of said at least one polyamine-epihalohydron resin.

7. A process for preparing polyamine-epihalohydrin resins having reduced levels of residuals, comprising:
   (a) charging a membrane separation apparatus with an aqueous composition comprising at least one polyamine-epihalohydrin resin;
   (b) separating said aqueous composition into a permeate and a retentate by passing said aqueous composition through the membrane of said membrane separation apparatus,
      wherein said membrane is a polyamide nanofiltratrion membrane having a nominal cut off range of 150 Daltons to 1000 Daltons, and
      wherein said retentate comprises an aqueous composition comprising at least one polyamine-epihalohydrin resin having lower levels of residuals on an equal active component basis than the aqueous composition of (a), and
      wherein said permeate comprises residuals removed from the aqueous composition of (a); and
   (c) treating the retentate with at least one basic agent under conditions to reduce and/or remove CPD-forming species,
      wherein the base treated retentate produces less than about 250 ppm dry basis of CPD when stored at pH 1 for 24 hours at 50° C.

8. A process for preparing polyamine-epihalohydrin resins having reduced levels of residuals, comprising:
   (a) treating at least one polyamine-epihalohydrin resin with at least one basic agent under conditions to reduce and/or remove CPD-forming species;
   (b) charging a membrane separation apparatus with an aqueous composition comprising the base-treated at least one polyamine-epihalohydrin resin; and
   (c) separating said aqueous composition into a permeate and a retentate by passing it through the membrane of said membrane separation apparatus,
      wherein said membrane is a polyamide nanofiltratrion membrane having a nominal cut off range of 150 Daltons to 1000 Daltons, and
      wherein said retentate comprises an aqueous composition comprising at least one polyamine-epihalohydrin resin having lower levels of residuals on an equal active component basis than the aqueous composition of (a), and
      wherein said permeate comprises residuals removed from the aqueous composition of (a), and
   wherein the retentate produces less than about 250 ppm dry basis of CPD when stored at pH 1 for 24 hours at 50 ° C.

9. The process of claim 7, wherein said permeate further comprises less than 5% by weight of the active component of said at least one polyamine-epihalohydrin resin.

10. The process of claim 8, wherein said permeate further comprises less than 5% by weight of the active component of said at least one polyamine-epihalohydrin resin.

11. The process of claim 7, wherein the polyamine-epihalohydrin resin comprises polyaminopolyamide-epichlorohydrin resin.

12. The process of claim 8, wherein the polyamine-epihalohydrin resin comprises polyaminopolyamide-epichlorohydrin resin.

13. The process of claim 7, further comprising treating the retenate of (c) with at least one acidic agent under conditions sufficient to obtain a gelation storage stable composition.

14. The process of claim 8 further comprising treating the base treated composition of (a) prior to (b) with at least one acidic agent under conditions sufficient to obtain a gelation storage stable composition.

15. The process of claim 13, wherein the acidic agent of said additional step is a non-halogen containing acid.

16. The process of claim 14, wherein the acidic agent of said additional step is a non-halogen containing acid.

\* \* \* \* \*